US012696107B2

(12) United States Patent
Kumar et al.

(10) Patent No.: US 12,696,107 B2
(45) Date of Patent: Jul. 28, 2026

(54) INDICATING CAUSES FOR LIFE CYCLE MANAGEMENT OPERATIONS

(71) Applicant: QUALCOMM Incorporated, San Diego, CA (US)

(72) Inventors: Rajeev Kumar, San Diego, CA (US); Aziz Gholmieh, Del Mar, CA (US); Taesang Yoo, San Diego, CA (US); Jay Kumar Sundararajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 473 days.

(21) Appl. No.: 18/362,759

(22) Filed: Jul. 31, 2023

(65) Prior Publication Data

US 2025/0048131 A1 Feb. 6, 2025

(51) Int. Cl.
| | |
|---|---|
| *H04W 24/02* | (2009.01) |
| *G06N 20/00* | (2019.01) |
| *H04L 41/16* | (2022.01) |
| *H04W 24/10* | (2009.01) |

(52) U.S. Cl.
CPC ............ *H04W 24/02* (2013.01); *G06N 20/00* (2019.01); *H04L 41/16* (2013.01); *H04W 24/10* (2013.01)

(58) Field of Classification Search
CPC ....... H04W 8/24; H04W 16/22; H04W 24/02; H04W 24/10
See application file for complete search history.

(56) References Cited

U.S. PATENT DOCUMENTS

| | | | |
|---|---|---|---|
| 2023/0100253 A1* | 3/2023 | Zhu ...................... | G06N 3/0464 |
| | | | 706/26 |
| 2025/0219898 A1* | 7/2025 | Li .......................... | G06N 3/084 |

* cited by examiner

*Primary Examiner* — Sam Bhattacharya
(74) *Attorney, Agent, or Firm* — Holland & Hart LLP

(57) ABSTRACT

Methods, systems, and devices for wireless communication are described. A network entity may monitor a performance of a machine learning (ML) model or ML model-based functionality associated with a user equipment (UE). The UE may receive one or more control messages that indicate a life cycle management (LCM) operation for the ML model or ML model-based functionality. The one or more control messages may include an indication of whether the LCM operation is based on the performance of the MIL model or ML model-based functionality. In some examples, the indication may include or be an example of a performance report associated with the performance of the ML model or ML model-based functionality. The UE may perform the LCM operation for the ML model or ML model-based functionality. The UE or the network entity may transmit the indication to a server associated with the ML model or ML model-based functionality.

30 Claims, 18 Drawing Sheets

130-a 125-c 205-b 215-a 125-d 105-a

220

125-f 205-c 125-e

210

205-a

203

125-a 115-a 215-b 125-b 110-a

200

130

105

115

Network
Entity

Transceiver

1210

Antenna

1215

Communications
Manager

Memory

Code

1230

1225

1220

1240

Processor

1235

1205

1200

Figure 13:
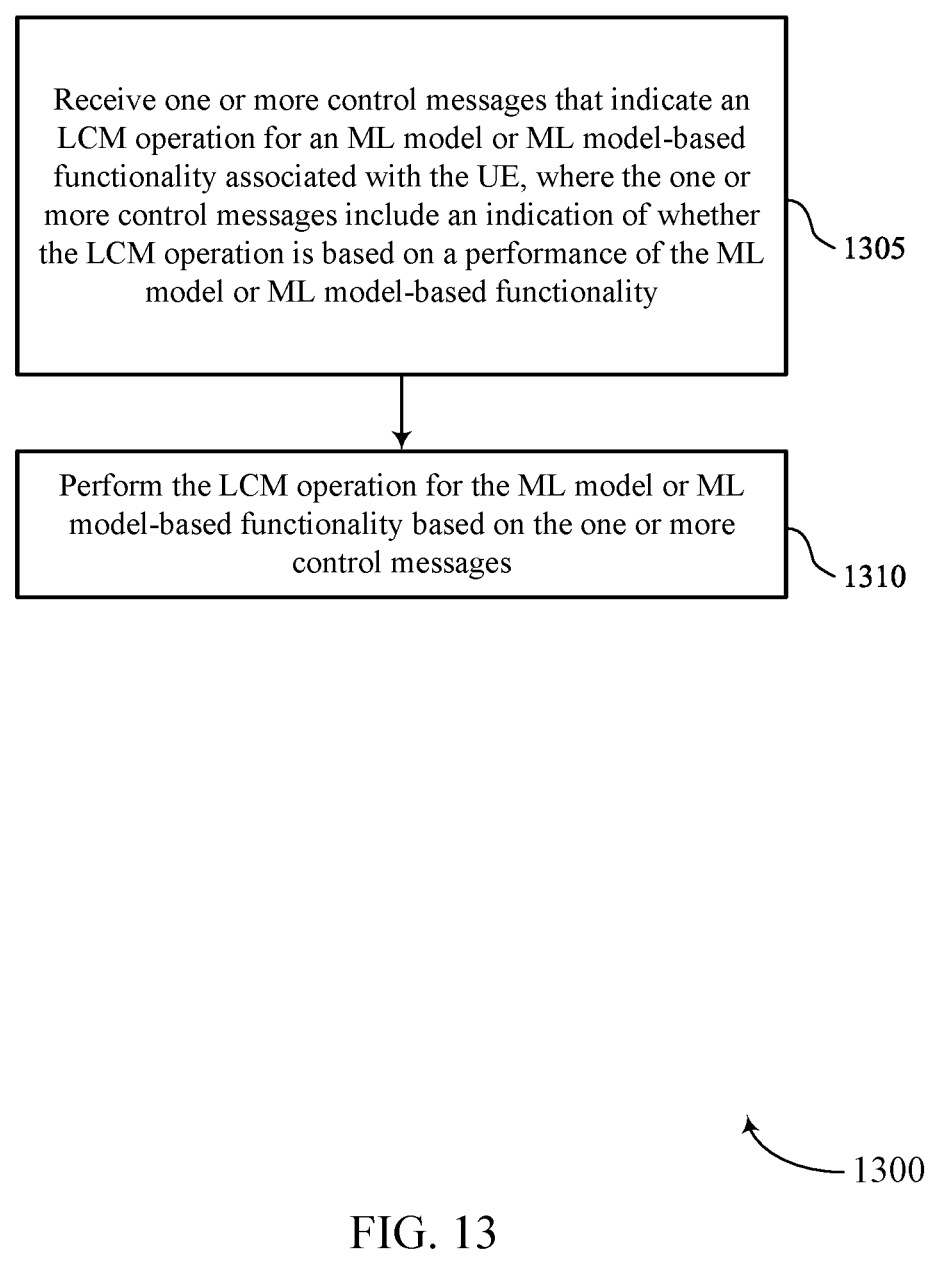

Receive one or more control messages that indicate an LCM operation for an ML model or ML model-based functionality associated with the UE, where the one or more control messages include an indication of whether the LCM operation is based on a performance of the ML model or ML model-based functionality

1305

Perform the LCM operation for the ML model or ML model-based functionality based on the one or more control messages

Figure 14:
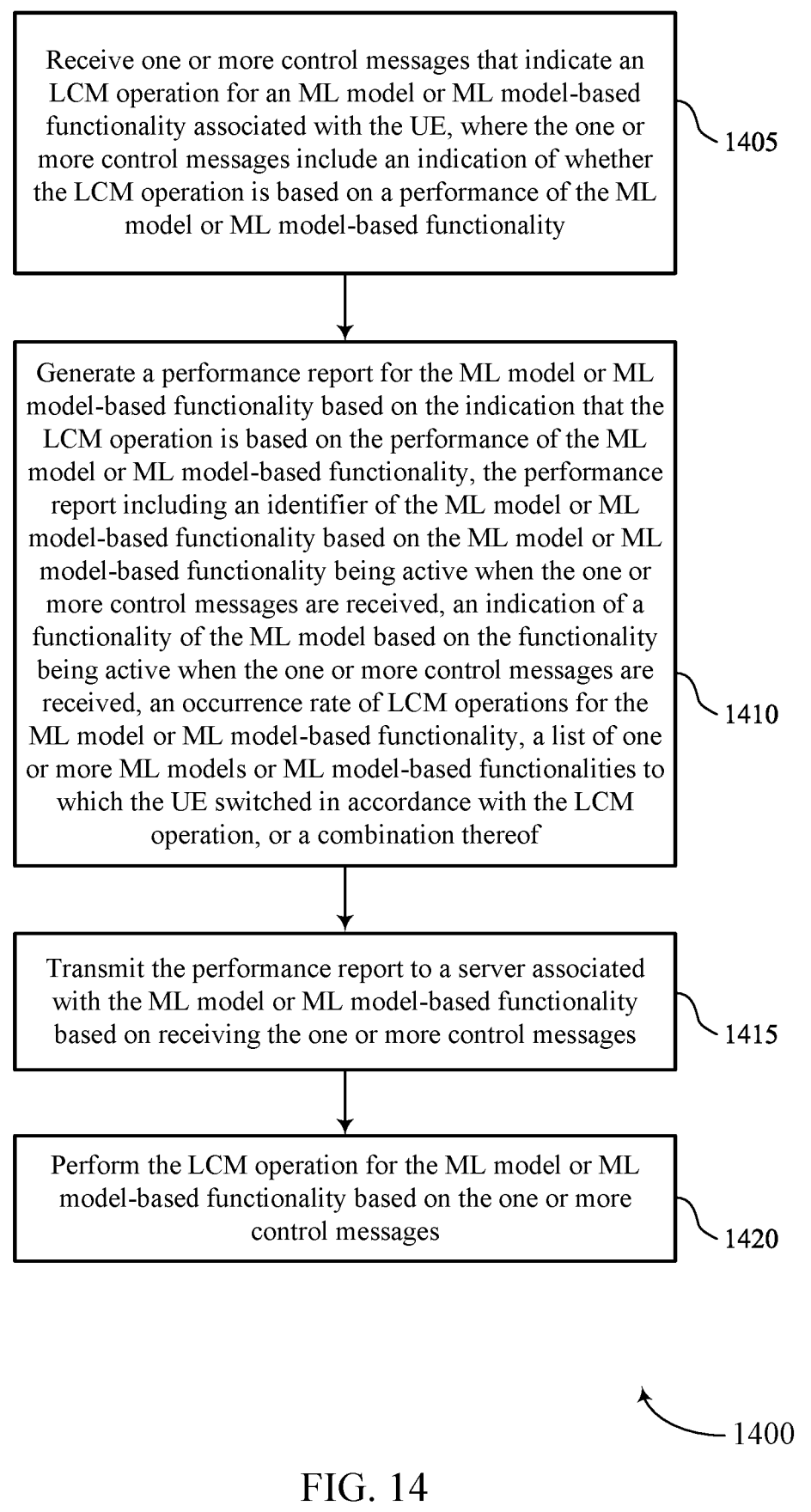

Receive one or more control messages that indicate an LCM operation for an ML model or ML model-based functionality associated with the UE, where the one or more control messages include an indication of whether the LCM operation is based on a performance of the ML model or ML model-based functionality

— 1405

Generate a performance report for the ML model or ML model-based functionality based on the indication that the LCM operation is based on the performance of the ML model or ML model-based functionality, the performance report including an identifier of the ML model or ML model-based functionality based on the ML model or ML model-based functionality being active when the one or more control messages are received, an indication of a functionality of the ML model based on the functionality being active when the one or more control messages are received, an occurrence rate of LCM operations for the ML model or ML model-based functionality, a list of one or more ML models or ML model-based functionalities to which the UE switched in accordance with the LCM operation, or a combination thereof

— 1410

Transmit the performance report to a server associated with the ML model or ML model-based functionality based on receiving the one or more control messages

— 1415

Perform the LCM operation for the ML model or ML model-based functionality based on the one or more control messages

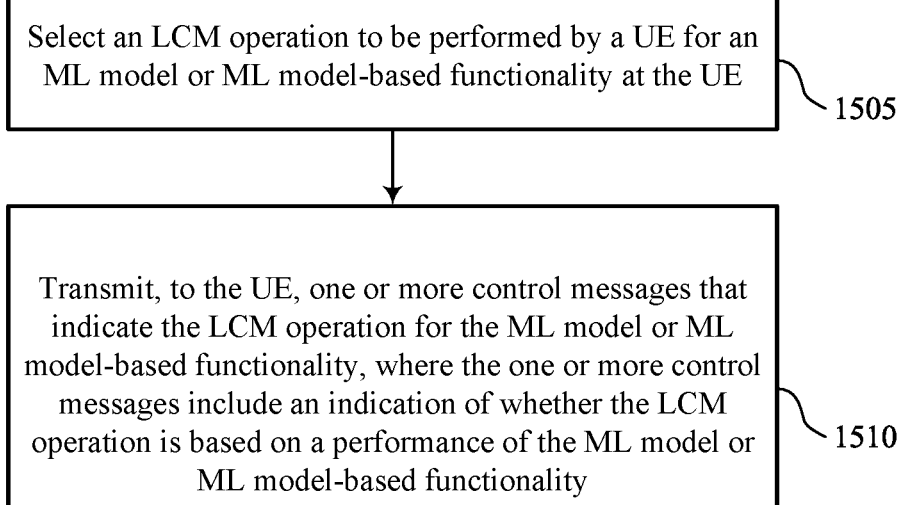

Select an LCM operation to be performed by a UE for an ML model or ML model-based functionality at the UE

1505

Transmit, to the UE, one or more control messages that indicate the LCM operation for the ML model or ML model-based functionality, where the one or more control messages include an indication of whether the LCM operation is based on a performance of the ML model or ML model-based functionality

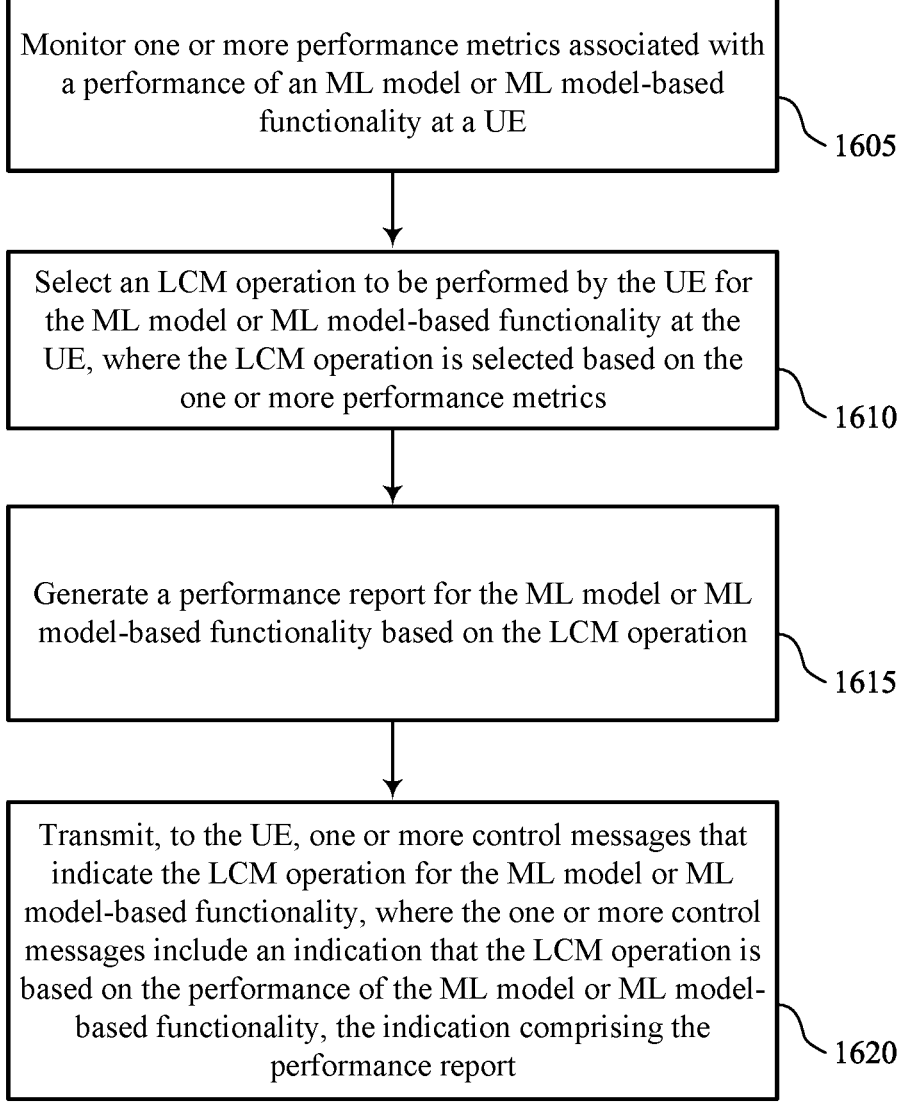

Monitor one or more performance metrics associated with a performance of an ML model or ML model-based functionality at a UE

1605

Select an LCM operation to be performed by the UE for the ML model or ML model-based functionality at the UE, where the LCM operation is selected based on the one or more performance metrics

1610

Generate a performance report for the ML model or ML model-based functionality based on the LCM operation

1615

Transmit, to the UE, one or more control messages that indicate the LCM operation for the ML model or ML model-based functionality, where the one or more control messages include an indication that the LCM operation is based on the performance of the ML model or ML model-based functionality, the indication comprising the performance report

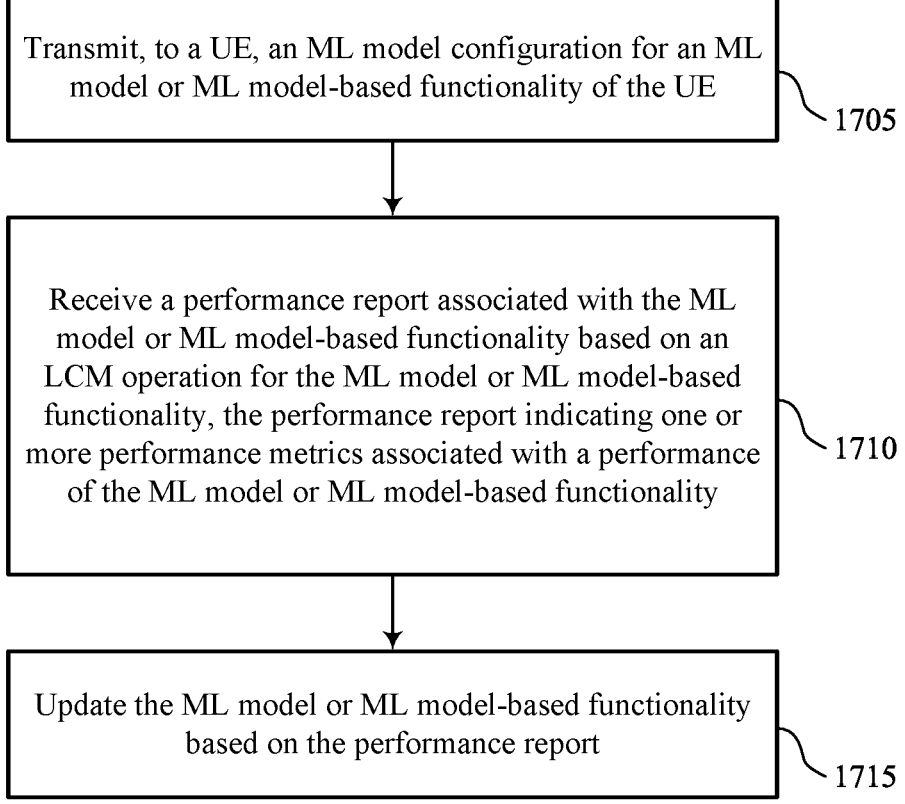

Transmit, to a UE, an ML model configuration for an ML model or ML model-based functionality of the UE

~1705

Receive a performance report associated with the ML model or ML model-based functionality based on an LCM operation for the ML model or ML model-based functionality, the performance report indicating one or more performance metrics associated with a performance of the ML model or ML model-based functionality

~1710

Update the ML model or ML model-based functionality based on the performance report

INDICATING CAUSES FOR LIFE CYCLE MANAGEMENT OPERATIONS

FIELD OF TECHNOLOGY

The following relates to wireless communication, including indicating causes for life cycle management (LCM) operations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless devices (e.g., network entities, UEs) may support the use of predictive models and functionalities (e.g., neural networks (NNs), artificial intelligence (AI) models, machine learning (ML) models, or the like), or other techniques, to perform one or more functions.

SUMMARY

The described techniques relate to improved methods, systems, devices, and apparatuses that support indicating causes for life cycle management (LCM) operations. For example, the described techniques provide for a network entity to share information with a user equipment (UE) about an LCM operation for a machine learning (ML) model, artificial intelligence (AI) model, or any other model-based functionality at the UE. The UE may be configured with the ML model or ML model-based functionality by an associated server, and the network entity may monitor a performance of the ML model or ML model-based functionality. The network entity may select the LCM operation based on the monitored performance. Alternatively, the network entity may select the LCM operation based on a network performance metric or a network operation (e.g., a transition to an energy-saving mode). In either case, the network entity may indicate, to the UE or the server, the LCM operation and the reason for selection of the LCM operation. For instance, the network entity may indicate whether the LCM operation was selected due to the performance of the ML model or ML model-based functionality. In some cases, the network entity may additionally or alternatively provide, to the UE or the server, a performance report for the ML model or ML model-based functionality.

A method for wireless communication by a UE is described. The method may include receiving one or more control messages that indicate an LCM operation for an ML model or ML model-based functionality associated with the UE, where the one or more control messages include an indication of whether the LCM operation is based on a performance of the ML model or ML model-based functionality and performing the LCM operation for the ML model or ML model-based functionality based on the one or more control messages.

A UE for wireless communication is described. The UE may include one or more memories storing processor executable code, and one or more processors coupled with the one or more memories. The one or more processors may individually or collectively operable to execute the code to cause the UE to receive one or more control messages that indicate an LCM operation for an ML model or ML model-based functionality associated with the UE, where the one or more control messages include an indication of whether the LCM operation is based on a performance of the ML model or ML model-based functionality and perform the LCM operation for the ML model or ML model-based functionality based on the one or more control messages.

Another UE for wireless communication is described. The UE may include means for receiving one or more control messages that indicate an LCM operation for an ML model or ML model-based functionality associated with the UE, where the one or more control messages include an indication of whether the LCM operation is based on a performance of the ML model or ML model-based functionality and means for performing the LCM operation for the ML model or ML model-based functionality based on the one or more control messages.

A non-transitory computer-readable medium storing code for wireless communication is described. The code may include instructions executable by at least one processor to receive one or more control messages that indicate an LCM operation for an ML model or ML model-based functionality associated with the UE, where the one or more control messages include an indication of whether the LCM operation is based on a performance of the ML model or ML model-based functionality and perform the LCM operation for the ML model or ML model-based functionality based on the one or more control messages.

In some examples of the method, UEs, and non-transitory computer-readable medium described herein, the indication may further include a cause of the LCM operation, the cause including at least one of the performance of the ML model or ML model-based functionality, a network associated with the UE being overloaded, and a network associated with the UE transitioning to an energy-saving mode.

In some examples of the method, UEs, and non-transitory computer-readable medium described herein, the indication may further include a performance report for the ML model or ML model-based functionality based on the LCM operation.

Some examples of the method, UEs, and non-transitory computer-readable medium described herein may further include operations, features, means, or instructions for transmitting, to a network entity, a message including a request for the performance report, where receiving the one or more control messages may be based on the request.

Some examples of the method, UEs, and non-transitory computer-readable medium described herein may further include operations, features, means, or instructions for transmitting, within the message, an indication of one or more parameters for the performance report, the one or more parameters including one or more performance metrics associated with the ML model or ML model-based functionality that may be to be included in the performance report, a time duration for the network entity to monitor the one or more performance metrics, or a combination thereof.

Some examples of the method, UEs, and non-transitory computer-readable medium described herein may further include operations, features, means, or instructions for transmitting the performance report to a server associated with the ML model or ML model-based functionality based on receiving the one or more control messages.

Some examples of the method, UEs, and non-transitory computer-readable medium described herein may further include operations, features, means, or instructions for receiving the performance report from a network entity, where transmitting the performance report may be based on receiving the performance report.

In some examples of the method, UEs, and non-transitory computer-readable medium described herein, the performance report includes at least one of an indication of one or more performance metrics associated with the ML model or ML model-based functionality, an indication of a time duration during which the one or more performance metrics were monitored, an indication of a network operation that triggered the LCM operation, an indication of a network performance metric that triggered the LCM operation, or a combination thereof.

In some examples of the method, UEs, and non-transitory computer-readable medium described herein, the performance report includes one or more statistics corresponding to the performance of the ML model or ML model-based functionality for a time duration, the one or more statistics including an indication of an occurrence rate of LCM operations for the ML model or ML model-based functionality, a mapping between the performance of the ML model or ML model-based functionality and a set of LCM operations including the LCM operation, a list of one or more ML models or ML model-based functionalities to which the UE switched in accordance with the LCM operation, an indication of a respective occurrence rate associated with the UE switching to each ML model or ML model-based functionality of the one or more ML models or ML model-based functionalities, or a combination thereof.

Some examples of the method, UEs, and non-transitory computer-readable medium described herein may further include operations, features, means, or instructions for generating a performance report for the ML model or ML model-based functionality based on the indication that the LCM operation may be based on the performance of the ML model or ML model-based functionality, the performance report including an identifier of the ML model or ML model-based functionality based on the ML model or ML model-based functionality being active when the one or more control messages may be received, an indication of a functionality of the ML model based on the functionality being active when the one or more control messages may be received, an occurrence rate of LCM operations for the ML model or ML model-based functionality, a list of one or more ML models or ML model-based functionalities to which the UE switched in accordance with the LCM operation, or a combination thereof.

Some examples of the method, UEs, and non-transitory computer-readable medium described herein may further include operations, features, means, or instructions for transmitting the performance report to a server associated with the ML model or ML model-based functionality based on receiving the one or more control messages.

In some examples of the method, UEs, and non-transitory computer-readable medium described herein, the indication includes a single bit, a first value of the bit corresponds to an indication that the LCM operation may be based on the performance of the ML model or ML model-based functionality, and a second value of the bit corresponds to an indication that the LCM operation may be based on a performance metric of a network to which the UE belongs.

In some examples of the method, UEs, and non-transitory computer-readable medium described herein, the LCM operation includes at least one of activation of the ML model or ML model-based functionality, deactivation of the ML model or ML model-based functionality, a fallback to the ML model or ML model-based functionality, and a switch to the ML model or ML model-based functionality.

In some examples of the method, UEs, and non-transitory computer-readable medium described herein, the indication further includes information about a decision, by a network entity, to indicate the LCM operation to the UE.

A method for wireless communication by a network entity is described. The method may include selecting an LCM operation to be performed by a UE for an ML model or ML model-based functionality at the UE and transmitting, to the UE, one or more control messages that indicate the LCM operation for the ML model or ML model-based functionality, where the one or more control messages include an indication of whether the LCM operation is based on a performance of the ML model or ML model-based functionality.

A network entity for wireless communication is described. The network entity may include one or more memories storing processor executable code, and one or more processors coupled with the one or more memories. The one or more processors may individually or collectively operable to execute the code to cause the network entity to select an LCM operation to be performed by a UE for an ML model or ML model-based functionality at the UE and transmit, to the UE, one or more control messages that indicate the LCM operation for the ML model or ML model-based functionality, where the one or more control messages include an indication of whether the LCM operation is based on a performance of the ML model or ML model-based functionality.

Another network entity for wireless communication is described. The network entity may include means for selecting an LCM operation to be performed by a UE for an ML model or ML model-based functionality at the UE and means for transmitting, to the UE, one or more control messages that indicate the LCM operation for the ML model or ML model-based functionality, where the one or more control messages include an indication of whether the LCM operation is based on a performance of the ML model or ML model-based functionality.

A non-transitory computer-readable medium storing code for wireless communication is described. The code may include instructions executable by at least one processor to select an LCM operation to be performed by a UE for an ML model or ML model-based functionality at the UE and transmit, to the UE, one or more control messages that indicate the LCM operation for the ML model or ML model-based functionality, where the one or more control messages include an indication of whether the LCM operation is based on a performance of the ML model or ML model-based functionality.

Some examples of the method, network entities, and non-transitory computer-readable medium described herein may further include operations, features, means, or instructions for monitoring one or more performance metrics associated with the performance of the ML model or ML model-based functionality, where the LCM operation may be selected based on the one or more performance metrics, and where the one or more control messages include the indication that the LCM operation may be based on the performance of the ML model or ML model-based functionality.

Some examples of the method, network entities, and non-transitory computer-readable medium described herein may further include operations, features, means, or instructions for monitoring one or more network performance metrics associated with a network to which the network entity and the UE belong, where the LCM operation may be selected based on the one or more network performance metrics, and where the one or more control messages include the indication that the LCM operation may be based on the one or more network performance metrics.

In some examples of the method, network entities, and non-transitory computer-readable medium described herein, the LCM operation may be selected in accordance with a decision, by a network associated with the network entity and the UE, to operate in an energy-saving mode and the one or more control messages include the indication that the LCM operation may be based on the decision.

In some examples of the method, network entities, and non-transitory computer-readable medium described herein, transmitting the one or more control messages may include operations, features, means, or instructions for generating a performance report for the ML model or ML model-based functionality based on the LCM operation and transmitting the indication including the performance report.

Some examples of the method, network entities, and non-transitory computer-readable medium described herein may further include operations, features, means, or instructions for receiving a message including a request for the performance report, where transmitting the one or more control messages may be based on the request.

Some examples of the method, network entities, and non-transitory computer-readable medium described herein may further include operations, features, means, or instructions for receiving a message indicating one or more parameters for the performance report, the one or more parameters including one or more performance metrics associated with the ML model or ML model-based functionality that may be to be included in the performance report, a time duration for the network entity to monitor the one or more performance metrics, or a combination thereof, where the indication including the performance report may be transmitted in accordance with the one or more parameters.

Some examples of the method, network entities, and non-transitory computer-readable medium described herein may further include operations, features, means, or instructions for transmitting the performance report to a server associated with the ML model or ML model-based functionality based on transmitting the one or more control messages.

In some examples of the method, network entities, and non-transitory computer-readable medium described herein, the performance report includes at least one of an indication of one or more performance metrics associated with the ML model or ML model-based functionality, an indication of a time duration during which the one or more performance metrics were monitored, an indication of a network operation that triggered the LCM operation, an indication of a network performance metric that triggered the LCM operation, or a combination thereof.

In some examples of the method, network entities, and non-transitory computer-readable medium described herein, the performance report includes one or more statistics corresponding to the performance of the ML model or ML model-based functionality for a time duration, the one or more statistics including an indication of an occurrence rate of LCM operations for the ML model or ML model-based functionality, a mapping between the performance of the ML model or ML model-based functionality and a set of LCM operations including the LCM operation, a list of one or more ML models or ML model-based functionalities to which the UE switched in accordance with the LCM operation, an indication of a respective occurrence rate associated with the UE switching to each ML model or ML model-based functionality of the one or more ML models or ML model-based functionalities, or a combination thereof.

In some examples of the method, network entities, and non-transitory computer-readable medium described herein, the indication includes a single bit, a first value of the bit corresponds to an indication that the LCM operation may be based on the performance of the ML model or ML model-based functionality, and a second value of the bit corresponds to an indication that the LCM operation may be based on a performance metric of a network to which the UE belongs.

In some examples of the method, network entities, and non-transitory computer-readable medium described herein, the LCM operation includes at least one of activation of the ML model or ML model-based functionality, deactivation of the ML model or ML model-based functionality, a fallback to the ML model or ML model-based functionality, and a switch to the ML model or ML model-based functionality.

A method for wireless communication by a server is described. The method may include transmitting, to a UE, an ML model configuration for an ML model or ML model-based functionality of the UE, receiving a performance report associated with the ML model or ML model-based functionality based on an LCM operation for the ML model or ML model-based functionality, the performance report indicating one or more performance metrics associated with a performance of the ML model or ML model-based functionality, and updating the ML model or ML model-based functionality based on the performance report.

A server for wireless communication is described. The server may include one or more memories storing processor executable code, and one or more processors coupled with the one or more memories. The one or more processors may individually or collectively operable to execute the code to cause the server to transmit, to a UE, an ML model configuration for an ML model or ML model-based functionality of the UE, receive a performance report associated with the ML model or ML model-based functionality based on an LCM operation for the ML model or ML model-based functionality, the performance report indicating one or more performance metrics associated with a performance of the ML model or ML model-based functionality, and update the ML model or ML model-based functionality based on the performance report.

Another server for wireless communication is described. The server may include means for transmitting, to a UE, an ML model configuration for an ML model or ML model-based functionality of the UE, means for receiving a performance report associated with the ML model or ML model-based functionality based on an LCM operation for the ML model or ML model-based functionality, the performance report indicating one or more performance metrics associated with a performance of the ML model or ML model-based functionality, and means for updating the ML model or ML model-based functionality based on the performance report.

A non-transitory computer-readable medium storing code for wireless communication is described. The code may include instructions executable by at least one processor to transmit, to a UE, an ML model configuration for an ML model or ML model-based functionality of the UE, receive a performance report associated with the ML model or ML model-based functionality based on an LCM operation for the ML model or ML model-based functionality, the performance report indicating one or more performance metrics associated with a performance of the ML model or ML model-based functionality, and update the ML model or ML model-based functionality based on the performance report.

Some examples of the method, servers, and non-transitory computer-readable medium described herein may further include operations, features, means, or instructions for transmitting, to a network entity, a message including a request for the performance report, where the performance report may be received from the network entity based on the request.

Some examples of the method, servers, and non-transitory computer-readable medium described herein may further include operations, features, means, or instructions for transmitting, within the message, an indication of one or more parameters for the performance report, the one or more parameters including one or more performance metrics associated with the ML model or ML model-based functionality that may be to be included in the performance report, a time duration for the network entity to monitor the one or more performance metrics, or a combination thereof.

In some examples of the method, servers, and non-transitory computer-readable medium described herein, the performance report includes at least one of an indication of one or more performance metrics associated with the ML model or ML model-based functionality, an indication of a time duration during which the one or more performance metrics were monitored, an indication of a network operation that triggered the LCM operation, an indication of a network performance metric that triggered the LCM operation, or a combination thereof.

In some examples of the method, servers, and non-transitory computer-readable medium described herein, the performance report includes one or more statistics corresponding to the performance of the ML model or ML model-based functionality for a time duration, the one or more statistics including an indication of an occurrence rate of LCM operations for the ML model or ML model-based functionality, a mapping between the performance of the ML model and a set of LCM operations including the LCM operation, a list of one or more ML models or ML model-based functionalities to which the UE switched in accordance with the LCM operation, an indication of a respective occurrence rate associated with the UE switching to each ML model or ML model-based functionality of the one or more ML models or ML model-based functionalities, or a combination thereof.

In some examples of the method, servers, and non-transitory computer-readable medium described herein, receiving the performance report may include operations, features, means, or instructions for receiving the performance report from the UE, the performance report including an identifier of the ML model or ML model-based functionality, an indication of a functionality of the ML model or ML model-based functionality, an occurrence rate of LCM operations for the ML model or ML model-based functionality, a list of one or more ML models or ML model-based functionalities to which the UE switched in accordance with the LCM operation, or a combination thereof.

Some examples of the method, servers, and non-transitory computer-readable medium described herein may further include operations, features, means, or instructions for retraining the ML model or ML model-based functionality based on the performance report.

BRIEF DESCRIPTION OF THE DRAWINGS

FIGS. 13 through 18 show flowcharts illustrating methods that support indicating causes for LCM operations in accordance with one or more aspects of the present disclosure.

DETAILED DESCRIPTION

Figure 1:
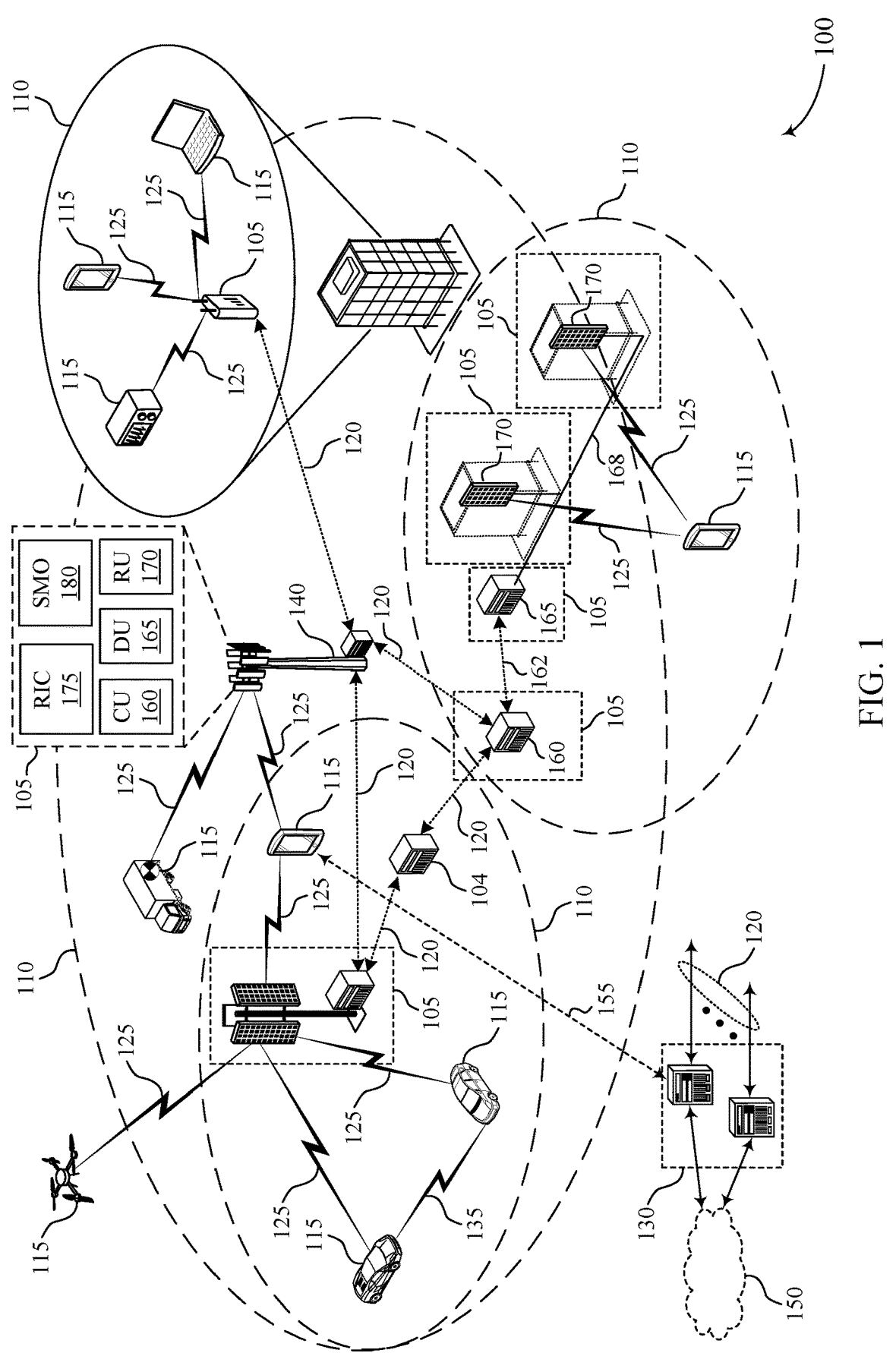
FIGS. 1 and 2 show examples of a wireless communications systems that support indicating causes for life cycle management (LCM) operations in accordance with one or more aspects of the present disclosure.

Some wireless devices (e.g., network entities, user equipment (UEs)) may support the use of machine learning (ML) models (e.g., neural networks (NNs), artificial intelligence (AI) models, machine learning (ML) models, predictive models, or the like) or ML model-based functionalities to perform one or more operations. In some cases, a network entity or a server may manage activation, deactivation, switching, fallback, and training of ML models and ML model-based functionalities at a UE. Such operations may be referred to herein as life cycle management (LCM) of an ML model or functionality. For example, a network entity may perform model identifier-based LCM by transmitting, to the UE, control signaling indicating that the UE is to perform an LCM operation for an ML model. In such examples, the ML models at the UE may be transparent to the network entity (e.g., the network entity may be aware of ML models, and their corresponding functionalities, at the UE), and the control signaling may indicate an identifier of the ML model for which the UE is to perform the LCM operation. Additionally, or alternatively, the network entity may perform functionality-based LCM, where the network entity is aware of ML model-based functionalities at the UE, but the underlying ML models for such functionalities are hidden from or unknown to the network entity. Here, the network entity may transmit, to the UE, control signaling indicating an LCM operation for the UE to perform for one or more ML model-based functionalities.

The network entity may be triggered or otherwise determine to perform LCM for one or more UEs for various reasons. In some cases, a network to which the UE and the network entity belong may be incapable of supporting an ML model or ML model-based functionality at the UE, as some ML models or ML model-based functionalities may incur signaling and processing overhead that exceed a threshold. For instance, the network may be overloaded and may not have sufficient communication resources available to support an ML model, so the network entity may deactivate the ML model at the UE. In another example, the network may deactivate an ML model when transitioning to an energy-saving mode as use of the ML model may increase energy consumption above a threshold. In other cases, however, the network entity may perform LCM based on a performance of an ML model or ML model-based functionality. If, for example, one or more performance metrics for an ML model fall below or otherwise fail to satisfy an associated performance threshold, the network entity may determine to deactivate the ML model or switch (or fallback) to a different ML model. In such cases, the UE may benefit from information about the LCM operation. For example, if the UE is aware that the LCM operation is due to an ML model's performance, the UE may adjust or retrain the ML model to improve the performance, or may report the performance to a server associated with the ML model for the server to adjust or retrain the ML model. If the UE is aware that the LCM operation is due to a network operation, such as the transition to the energy-saving mode, the UE may assume that the ML model performance is adequate and may refrain from adjusting the ML model (or the server may refrain from adjusting or retraining the ML model), thereby conserving power and avoiding unnecessary changes that may negatively impact the ML model's performance.

In accordance with various techniques discussed herein, the network entity may provide, to the UE, a cause or reason for a decision to perform an LCM operation for an ML model or an ML model-based functionality. In some cases, the network entity may transmit a binary indication (e.g., a one-bit indicator) to convey whether the LCM operation was due to a performance of the ML model or ML model-based functionality. For instance, a first value (e.g., 0) of the binary indication may indicate that the performance of the ML model or ML model-based functionality is the reason for the LCM operation, while a second value (e.g., 1) of the binary indication may indicate that the LCM operation is due to a network operation or network performance. In some examples, the network entity may transmit a performance report that includes information about the cause of or reason for the LCM operation, such as performance metrics or long-term statistics associated with the performance of the ML model or ML model-based functionality, an indication of a network operation or network performance metric that triggered the LCM operation, or a combination thereof. The binary indication or the performance report may be transmitted to the UE within the same control signaling that indicates the LCM operation or may be transmitted as part of a separate control message.

In response to receiving the binary indication or the performance report, the UE may communicate with a server associated with the ML model or ML model-based functionality. In some cases, the UE may generate a performance report (e.g., based on receiving the binary indication) including information associated with the ML model or ML model-based functionality and may transmit the performance report to the server. Additionally, or alternatively, the UE may forward the binary indication or performance report received from the network entity to the server. In some cases, the network entity may transmit the binary indication or performance report directly to the server. If the binary indication or a performance report received at the server indicates relatively poor performance by the ML model (e.g., indicates that the LCM operation was due to the ML model's performance), the server may adjust or retrain the ML model to improve its performance at the UE. In such scenarios, the server may transmit signaling to the UE updating the ML model.

Aspects of the disclosure are initially described in the context of wireless communications systems. Aspects of the disclosure are then discussed with reference to process flows. Aspects of the disclosure are further illustrated by and described with reference to apparatus diagrams, system diagrams, and flowcharts that relate to indicating causes for LCM operations.

FIG. 1 shows an example of a wireless communications system 100 that supports indicating causes for life cycle management operations in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support indicating causes for life cycle management operations as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to differ-ent receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configu-ration may be aligned along a beam direction determined based on listening according to different receive configura-tion directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communi-cate via logical channels. A MAC layer may perform priority handling and multiplexing of logical channels into transport channels. The MAC layer also may implement error detec-tion techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the like-lihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Devices in the wireless communications system 100 may implement ML or AI techniques. For example, a wireless device (e.g., an operation, administration, and management (OAM) node, a network node (e.g., a core network node, a network entity 105), a server, a training entity, or the like) may configure, activate, and train an ML model to perform a function or functionality (e.g., an ML model-based func-tionality). The wireless device may collect data at the wireless device, from other devices (e.g., UEs 115, network entities 105, or the like), or both, to provide to the ML model as input data. The ML model may include a model training function that prepares data (e.g., pre-processes, cleans, for-mats, and transforms input data) and performs training, validation, and testing of the ML model using the prepared data. Training an ML model may include providing training input data so that the ML model "learns" appropriate outputs for a function or objective of the ML model. The ML model may be validated to confirm that appropriate outputs are generated for a set of known input data. The ML model may also include a model inference function that provides model inference outputs, such as predictions or decisions. The model inference function may prepare data (e.g., pre-pro-cess, clean, format, and transform input data) for the model inference.

In some examples, an ML model may be generated (e.g., developed) and trained at a first network node (e.g., the wireless device) and deployed (e.g., transmitted) to other network nodes or UEs 115 for operation at the other network nodes or UEs 115. In some cases, the wireless device may develop or generate a set of different ML models for different functions (e.g., objectives), features, or feature groups. For example, the wireless device may generate multiple NN, AI, or ML models for network energy saving operations, load balancing, mobility optimization, beam management, CSI feedback, positioning procedures, or a combination thereof, among other examples. Further, in some cases, a same function may be associated with multiple different ML models that are used in different scenarios, conditions, or the like. In any case, the wireless device may configure a UE 115 with one or more ML models for operation at the UE 115. Each ML model may be associated with a model identifier (ID) and one or more functionality parameters (e.g., corresponding to the function or objective to be performed by the ML model). The UE 115 may run an ML model by providing input data to the ML model, which may generate one or more outputs (e.g., predictions) for use by the UE 115. Additionally, the UE 115 may update the ML model over time. For example, the UE 115 may train, test, and validate the ML model over time using different datasets as input data, such as datasets obtained by the UE 115 from other devices or from measurements performed by the UE 115. In some examples, the UE 115 may receive updates for the ML model from the wireless device. For instance, the wireless device may train or retrain the ML model over time and may indicate an updated configuration for the ML model to the UE 115. The UE 115 may adjust or otherwise update the ML model using the updated configuration.

A network entity 105 may transmit, to the UE 115, one or more control messages indicating an LCM operation for the UE 115 to perform for the ML model. An LCM operation may include, but is not limited to, activation, deactivation, switching, or fallback of an ML model. For example, some ML models may be associated with relatively high power consumption and signaling or processing overhead. Thus, in some scenarios, a network may be unable to support use of an ML model and may instruct the UE 115 to deactivate the ML model or to switch or fall back to a different ML model. As a specific example, when the network is overloaded, there may not be sufficient communication resources avail-able for the UE 115 to run an ML model that enhances channel state information (CSI) feedback procedures. Here, the network entity 105 may transmit a control message to the UE 115 indicating that the UE 115 is to deactivate the ML model. In another example, the network may transition to an energy-saving mode. The network entity 105 may indicate, to the UE 115, to switch to an ML model that consumes relatively less power.

In other examples, the network entity 105 may determine to perform an LCM operation for the ML model based on a performance of the ML model. For example, the network entity 105 may monitor one or more performance metrics associated with the performance of the ML model. If the one or more performance metrics fail to satisfy a corresponding performance threshold, the network entity 105 may deactivate the ML model at the UE 115 (e.g., or perform a different LCM operation). In such cases, however, the control message indicating the LCM operation may not provide sufficient information for the UE 115 to appropriately manage the ML model. For example, the UE 115 may be unaware of whether the LCM operation was due to the performance of the ML model or due a network operation such as the network transitioning to the energy-saving mode or being overloaded. Without such knowledge, the UE 115 may be unable to determine whether retraining or updating of the ML model should be performed (e.g., by the UE 115 or the wireless device).

The techniques described herein support signaling information related to LCM operation decisions (e.g., made by the network entity 105 and indicated to the UE 115). For instance, the network entity 105 may include, in the control message indicating the LCM operation or in a different control message, an indication of whether the LCM operation is selected due to performance of the ML model or for another reason (e.g., a network operation or network performance). In some cases, the indication may include or be an example of a performance report for the ML model, one or more statistics related to the performance of the ML model over time, an indication of the network operation or network performance that triggered the LCM operation, or the like, among other examples. Based on the indication, the UE 115 may make an appropriate training decision for the ML model. For example, if the indication conveys that the LCM operation was triggered because of the ML model's performance, the UE 115 may forward the indication to the wireless device, which may retrain the ML model and provide the UE 115 with an updated configuration for the ML model. If the indication instead provides information about a network operation or network performance metric that triggered the LCM operation, the UE 115 may assume that no retraining or updating of the ML model is appropriate, and the UE 115 may refrain from communicating with the wireless device.

Figure 2:

FIG. 2 shows an example of a wireless communications system 200 that supports indicating causes for life cycle management operations in accordance with one or more aspects of the present disclosure. LCM operations in accordance with one or more aspects of the present disclosure. In some examples, wireless communications system 200 may implement aspects of wireless communications system 100 and may include a UE 115-a, a network entity 105-a, and a server 130-a, which may be examples of corresponding devices as described with reference to FIG. 1. Although described as communications between the UE 115-a, the network entity 105-a, and the server 130-a, any type or quantity of devices may implement the techniques described herein. Further, the techniques described herein may be implemented by any type or quantity of devices of any wireless communications system.

The UE 115-a and the network entity 105-a may communicate, within a coverage area 110-a served by the network entity 105-a, via a communication link 125-a (e.g., a downlink communication link) and a communication link 125-b (e.g., an uplink communication link). The network entity 105-a may communicate with the server 130-a via communication links 125-c and 125-d, while the UE 115-a and the server 130-a may communicate via communication links 125-e and 125-f. The server 130-a may include or be an example of a server (e.g., a core network node, an OAM) associated with one or more ML models configured for the UE 115-a. For example, the server 130-a may generate and train one or more ML models configured to perform one or more functionalities at the UE 115-a. The server 130-a may transmit, to the UE 115-a via the communication link 125-e, a control message 220 including an indication of the one or more ML models and a respective configuration for each of the one or more ML models. An ML model configuration may include a model identifier for the ML model, a functionality (e.g., objective) to be performed or otherwise obtained by the ML model, and a list of functionality parameters associated with the functionality and the ML model, among other examples. The UE 115-a may run the one or more ML models according to each respective configuration to perform the one or more functionalities.

In some cases, a UE 115-a may have relatively limited processing or power capabilities. Thus, the network entity 105-a, and in some cases, the server 130-a, may assist the UE 115-a in management and control of ML models and functionalities. For instance, the network entity 105-a may determine or otherwise select an LCM operation for the UE 115-a to perform on or for an ML model or ML model-based functionality. The network entity 105-a may manage the one or more ML models at the UE 115-a by determining whether to instruct the UE 115-a to perform one or more LCM operations. An LCM operation may include activation of the ML model or ML model-based functionality, deactivation of the ML model or ML model-based functionality, switching to a different ML model or ML model-based functionality, or falling back to a previously-used ML model or ML model-based functionality. The network entity 105-a may transmit control signaling, such as a control message 203, to the UE 115-a to indicate the LCM operation, and the UE 115-a may perform the indicated LCM operation for the ML model or ML model-based functionality based on receiving the control message 203. The control message 203 may include or be an example of a radio resource control (RRC) message, a media access control (MAC) control element (MAC-CE), downlink control information (DCI), or the like, among other examples.

In some cases, the control message 203 may indicate a model ID for the ML model to which the LCM operation is to be applied. In other cases, the control message 203 may indicate a functionality performed by one or more ML models, and the UE 115-a may perform the LCM operation for any ML models associated with the functionality. By way of the control message 203, the network entity 105-a may activate or deactivate an ML model or ML-based functionality at the UE 115-a, or may instruct the UE 115-a to switch or fall back to a different ML model or ML-based functionality.

In some examples, the network entity 105-a may explicitly indicate an ML model or ML model-based functionality associated with the LCM operation, e.g., within the control message 203. The network entity 105-a may be aware of (e.g., may obtain information associated with) ML models at the UE 115-a. For instance, a functionality (e.g., an ML model-based functionality) at the UE 115-a may have one or more underlying ML models that the UE 115-a runs to achieve the functionality, and the underlying ML models may be transparent to the network entity 105-a. In model-ID based LCM, the network entity 105-a may be configured (e.g., by the server 130-a) with a list of ML models and corresponding functionalities of the UE 115-a, where each ML model is associated with a respective ML model ID. The network entity 105-a may indicate (e.g., within the control message 203) an ML model ID for which the UE 115-a is to perform the LCM operation.

Alternatively, in functionality-based LCM, the network entity 105-a may manage and control ML-based functionalities at the UE 115-*a*, but may be unaware of underlying ML models associated with the ML-based functionalities (e.g., the underlying ML models may be hidden from the network). In such examples, the network entity 105-*a* may indicate (e.g., within the control message 203) the ML functionality associated with the LCM operation, for instance, via a functionality identifier. The UE 115-*a* may perform the LCM operation for the ML model associated with the indicated ML functionality.

The network entity 105-*a* may determine that an LCM operation is to be selected based on performance of the ML model or ML model-based functionality (e.g., as monitored by the network entity 105-*a*) or for a different reason, such as network-based performance metrics or procedures. For example, the network entity 105-*a* may monitor (e.g., measure or otherwise track) one or more performance metrics of the ML model or ML model-based functionality at the UE 115-*a*. The one or more performance metrics may include or be examples of key performance indicators (KPIs) of the ML model or ML model-based functionality and may be based on output(s), measurements, or qualities of the ML model or ML model-based functionality. For instance, the one or more performance metrics may include a minimum mean square error (MMSE) error metric, a model accuracy metric (e.g., based on the output of the ML model or ML model-based functionality), a recall metric, or the like, among other examples. Additionally, or alternatively, the one or more performance metrics may include or be examples of system- or device-related KPIs related to, dependent on, or affected by the performance of the ML model or ML model-based functionality. Here, the one or more performance metrics may include an uplink throughput metric, a downlink throughput metric, a packet loss value, an error rate (e.g., a MAC error rate, a HARQ error rate), or the like, among other examples.

The network entity 105-*a* may determine whether the performance of the ML model or ML model-based functionality is sufficient, for instance, by comparing the one or more performance metrics to one or more respective threshold values. If a performance metric fails to satisfy a corresponding threshold value, the network entity 105-*a* may determine that the ML model or ML model-based functionality is experiencing performance degradation and may determine an appropriate LCM operation for the UE 115-*a* to perform for the ML model or ML model-based functionality.

As an example, the network entity 105-*a* may transmit a control message 203 to the UE 115-*a* indicating that the UE 115-*a* is to activate an ML model. The network entity 105-*a* may monitor one or more performance metrics of the ML model while the ML model is run by the UE 115-*a*. Over time, the network entity 105-*a* may determine, based on the one or more performance metrics failing to satisfy a threshold, that a performance of the ML model has degraded. The network entity 105-*a* may determine to deactivate the ML model based on the one or more performance metrics and may transmit another control message 203 to the UE 115-*a* indicating the deactivation. Additionally, or alternatively, the network entity 105-*a* may determine that a second ML model at the UE 115-*a* may provide improved performance, and may indicate, via the control message 203, that the UE 115-*a* is to switch to the second ML model. For instance, the second ML model may be an ML model previously used by the UE 115-*a*, and the control message 203 may indicate that the UE 115-*a* is to fall back to the second ML model.

In another example, the network entity 105-*a* may select an LCM operation for the UE 115-*a* to perform for the ML model or ML model-based functionality based on a network procedure or network performance parameters. In some conditions or scenarios, the network associated with the UE 115-*a* and the network entity 105-*a* may be unable to support the ML model or ML model-based functionality, and the network entity 105-*a* may be triggered to select the LCM operation. For example, an ML model that supports CSI procedures at the UE 115-*a* may rely on relatively high power consumption at the UE 115-*a* and may utilize a threshold amount of communication resources. If the network is overloaded, the network entity 105-*a* may determine (e.g., be triggered) to deactivate the ML model at the UE 115-*a*, as the network may not have sufficient resources available for the CSI procedure. Additionally, or alternatively, the power consumption of the ML model may be incompatible with an energy-saving mode of operation of the network. In such examples, the network entity 105-*a* may deactivate the ML model by indicating the deactivation via the control message 203.

To assist the UE 115-*a* and the server 130-*a* in making appropriate decisions for operating and maintaining (e.g., training) the ML model or ML model-based functionality, the network entity 105-*a* may share information related to the decision, by the network entity 105-*a*, to indicate the LCM operation (e.g., based on determining that the UE 115-*a* is to perform the LCM operation). For example, the network entity 105-*a* may transmit a control message 205-*a* (e.g., RRC, MAC-CE, DCI) that includes an indication of whether the LCM operation is based on (e.g., because of) the performance of the ML model for which the LCM operation is to be performed. That is, the control message 205-*a* may indicate a cause or reason behind the network entity 105-*a* selecting the LCM operation for the ML model. The cause or reason may be, for example, the performance of the ML model or ML model-based functionality, the network performance parameter (e.g., the network being overloaded), the network operation (e.g., operation in an energy-saving mode), or the like, among other examples.

The network entity 105-*a* may indicate the cause or reason in a same control message as the indication of the LCM operation (e.g., the control message 205-*a* and the control message 203 may be the same). In some cases, and as discussed herein with reference to FIG. 3, the indication within the control message 205-*a* may be an example of a binary indication, where a first bit value of the indication corresponds to an indication that the network entity 105-*a* elected to indicate the LCM operation to the UE 115-*a* based on the performance of the ML model, while a second bit value of the indication corresponds to an indication that the network entity 105-*a* chose to indicate the LCM operation to the UE 115-*a* for a reason different from the performance of the ML model (e.g., the network performance parameter, the network operation, or the like).

Figure 4:
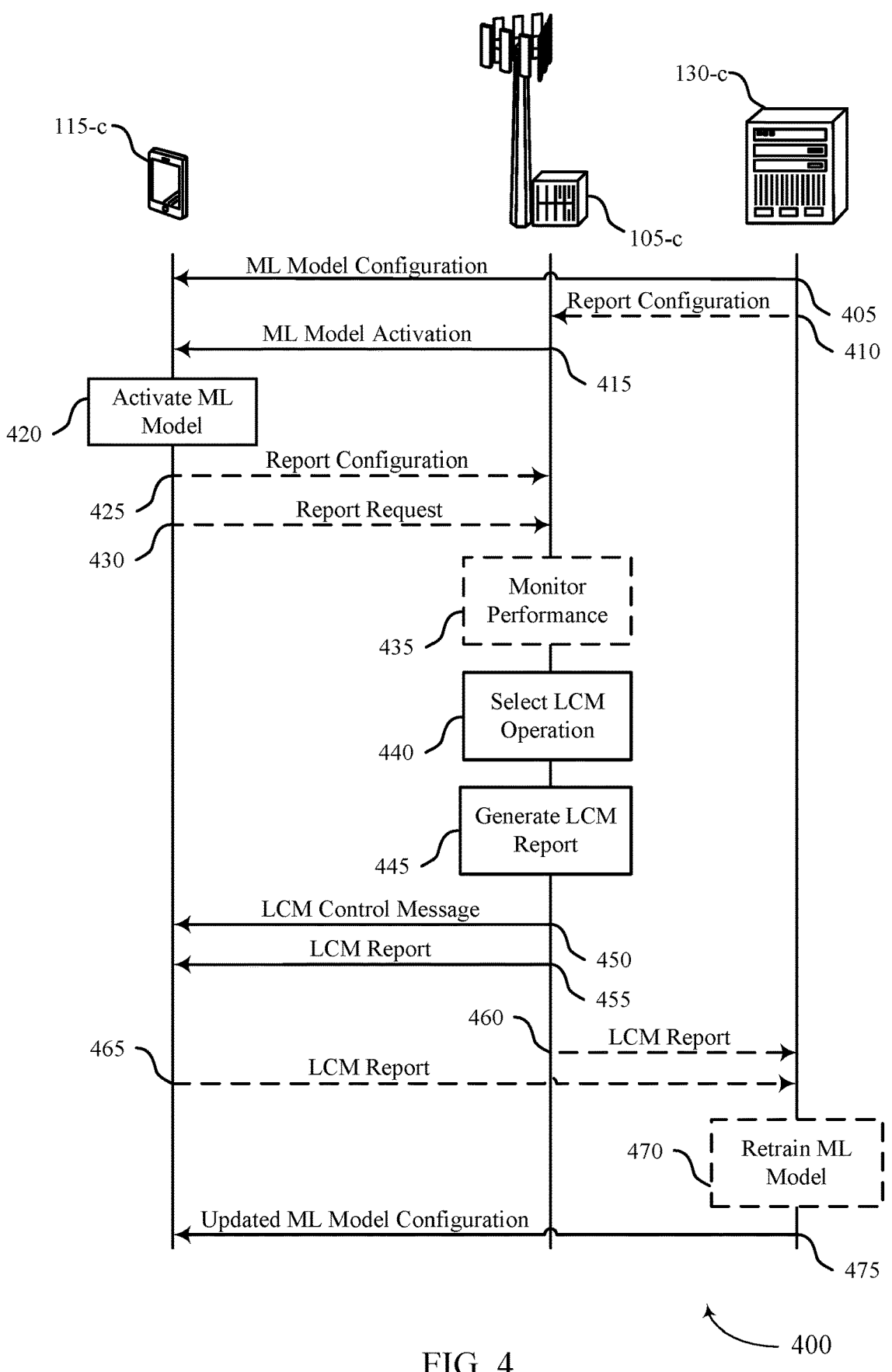

In other examples, and as discussed herein with reference to FIG. 4, the control message 205-*a* may include or be an example of a performance report generated by the network entity 105-*a*. The performance report may include more detailed information than the binary indication. For example, if the network entity 105-*a* selected the LCM operation based on the performance of the ML model or ML model-based functionality, the performance report may indicate a time or time duration during which the network entity 105-*a* monitored the performance and determined that the one or more performance metrics failed to satisfy the threshold. Additionally, or alternatively, the performance report may indicate a quantity or value associated with the one or more performance metrics, such as an amount by which the performance degraded, or a qualitative (e.g., relative) assessment of the performance. In some cases, the performance report may include one or more statistics related to the performance, e.g., as collected or otherwise determined by the network entity 105-a over a period of time. If the network entity 105-a selected the LCM operation for a reason other than the performance of the ML model or ML model-based functionality, the performance report may indicate the reason, such as that the network was overloaded, that the network transitioned to an energy saving mode, or the like.

Based on the control message 205-a, the UE 115-a may determine which, if any, actions may be taken for the ML model or ML model-based functionality. Using the information about the LCM operation (e.g., the cause or reason behind the LCM operation), the UE 115-a may determine whether the ML model or ML model-based functionality should be updated or retrained. For example, if the network entity 105-a indicates that the LCM operation is selected due to a network operation, the UE 115-a may assume that the performance of the ML model or ML model-based functionality is adequate. If, however, the network entity 105-a indicates relatively poor performance of the ML model or ML model-based functionality, the UE 115-a may determine that retraining or reconfiguring the ML model or ML model-based functionality may improve its performance. In some cases, the UE 115-a may communicate with the server 130-a based on the control message 205-a, e.g., so that the server 130-a may manage or retrain the ML model or ML model-based functionality.

In some cases, the UE 115-a may analyze the ML model or ML model-based functionality in combination with the LCM operation and the associated information. The UE 115-a may, for example, identify the ML model-based functionality that is active (e.g., in operation or otherwise running) when the UE 115-a receives the control message 203, the control message 205-a, or both. If the control message 205-a indicates that the active ML model-based functionality is performing relatively poorly, the UE 115-a may determine which ML models are associated with (e.g., underlying) the ML model-based functionality in order to perform the LCM operation. Additionally, or alternatively, the UE 115-a may determine other parameters associated with the ML model or ML model-based functionality performance, such as parameters associated with a scenario, environment, or location in which the UE 115-a is operating when the UE 115-a receives the control message 203, the control message 205-a, or both.

In some cases, the UE 115-a may forward, via a control message 205-c (e.g., RRC, MAC-CE), the information about the LCM operation (e.g., the control message 205-a) to the server 130-a associated with the ML model or ML model-based functionality so that the server 130-a may determine whether the ML model or ML model-based functionality should be retrained, adjusted, reconfigured, or the like. Additionally, or alternatively, the network entity 105-a may provide the server 130-a with the information about the LCM operation via a control message 205-b. In some cases, the UE 115-a, the server 130-a, or both, may request the information about the LCM operation from the network entity 105-a. The server 130-a or the UE 115-a may transmit a request message 215-a or a request message 215-b (e.g., UE assistance information (UAI), RRC), respectively, to the network entity 105-a indicating the request. When the control message 205-a includes a performance report associated with the LCM operation, the request messages 215 may include a configuration specifying the information to be included in the performance report.

In some examples, the UE 115-a may generate a performance report 210 based on receiving the control message 205-a. For example, if the control message 205-a indicates that the LCM operation was selected because of the performance of the ML model or ML model-based functionality, the UE 115-a may generate an ML model or ML model-based functionality performance report to transmit to the server 130-a. The performance report 210 may include an indication of the ML model, feature, feature group, or functionality associated with the ML model that was active at the UE 115-a when the UE 115-a received the control message 203, the control message 205-a, or both. Additionally, or alternatively, the performance report 210 may indicate an occurrence rate (i.e., frequency) with which LCM operations (e.g., activation, deactivation, switching, fallback) have been performed by the UE 115-a, e.g., for the ML model or ML model-based functionality. In some cases, the performance report 210 may include a list of ML models or ML model-based functionalities to which the UE 115-a switched in accordance with LCM operations, an occurrence rate of the switching, or both.

Based on receiving a control message 205 (e.g., the control message 205-b from the network entity 105-a or the control message 205-c from the UE 115-a), or the performance report 210, the server 130-a may select an appropriate management action for the ML model or ML model-based functionality. For example, if the control message 205 or the performance report 210 indicates relatively poor performance for the ML model or ML model-based functionality, the server 130-a may retrain the ML model or ML model-based functionality and provide the UE 115-a with an updated ML model or ML model-based functionality (e.g., after retraining). In some cases, the server 130-a may collect additional data for use in the retraining. Here, the server 130-a may identify (e.g., based on the control message 205 or the performance report 210) the other parameters associated with the performance of the ML model or ML model-based functionality, such as the scenario, environment, or location in which the UE 115-a operates when the performance of the ML model or ML model-based functionality is relatively poor. The server 130-a may collect data from other devices (e.g., other UEs 115) operating in similar scenarios, environments, or locations, to determine how such parameters may affect the ML model or ML model-based functionality and how the ML model or ML model-based functionality may be improved. For example, the server 130-a may determine that some ML models or ML model-based functionalities are not suitable for some scenarios, but may be utilized without performance degradation in other scenarios. Alternatively, if an ML model or ML model-based functionality experiences performance degradation regardless of the scenario, environment, or location, the server 130-a may determine that the ML model or ML model-based functionality is faulty and should be retrained or reconfigured.

Figure 3:
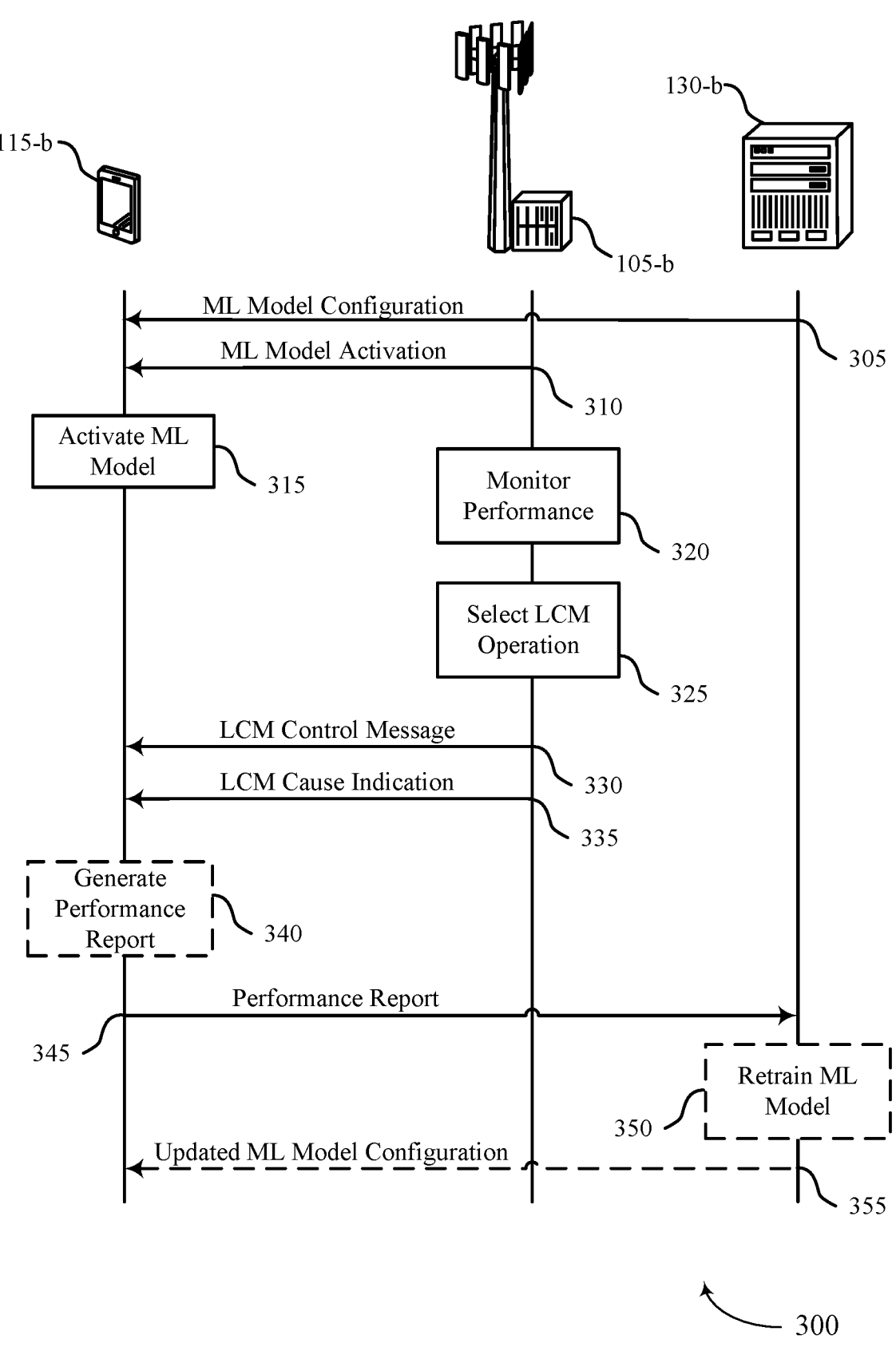
FIGS. 3 and 4 show examples of process flows that support indicating causes for LCM operations in accordance with one or more aspects of the present disclosure.

FIG. 3 shows an example of a process flow 300 that supports indicating causes for life cycle management operations in accordance with one or more aspects of the present disclosure. The process flow 300 may implement or be implemented to realize aspects of the wireless communications system 100 or the wireless communications system 200. For example, the process flow 300 illustrates a network in which a UE 115-b, a network entity 105-b, and a server 130-b may communicate, each of which may be examples of corresponding devices as described herein. In the process flow 300, the UE 115-*b* may support one or more ML models or ML model-based functionalities, which may be configured by the server 130-*b* and activated and managed by the network entity 105-*b*. The server 130-*b* may include or be an example of a UE server, an OAM, a training entity, a core network node, or any other type of device associated with the one or more ML models or ML model-based functionalities.

In the following description of the process flow 300, the operations may be performed (e.g., reported or provided) in a different order than the order shown, or the operations performed by the example devices may be performed in different orders or at different times. Additionally, although the process flow 300 is described with reference to the UE 115-*b*, the network entity 105-*b*, and the server 130-*b*, any type of device or combination of devices may perform the described operations. The example of the process flow 300 describes an ML model, but it is to be understood that the techniques described herein may be applicable to any type and quantity of ML, AI, or NN model, functionality, or feature. Some operations also may be omitted from the process flow 300, or other operations may be added to the process flow 300. Further, although some operations or signaling may be shown to occur at different times for discussion purposes, these operations may actually occur at the same time or otherwise concurrently.

At 305, the server 130-*b* may transmit, and the UE 115-*b* may receive, a message (e.g., a control message, such as an RRC message, MAC-CE, or the like) indicating an ML model configuration for an ML model at the UE 115-*b*. The ML model may be associated with an ML model ID and may be configured to perform a functionality at the UE 115-*a*. The functionality, in turn, may be associated with a functionality ID and a list of functionality parameters. In some cases, different features or feature groups may be defined for different ML models and ML model-based functionalities at the UE 115-*b*.

At 310, a network node, such as the network entity 105-*b*, may activate the ML model at the UE 115-*b*. For example, the network entity 105-*b* may transmit, and the UE 115-*b* may receive, control signaling including an indication for the UE 115-*b* to activate the ML model. The control signaling may indicate the ML model ID, the functionality ID, or both.

At 315, the UE 115-*b* may activate (e.g., run) the ML model, e.g., based on receiving the control signaling at 310. If the control signaling indicates the functionality ID, the UE 115-*b* may determine and activate the ML model associated with (e.g., underlying) the functionality ID.

At 320, the network entity 105-*b* may monitor a performance of the ML model at the UE 115-*b*. The network entity 105-*a* may, for example, monitor (e.g., measure) one or more performance metrics associated with the performance of the ML model. The network entity 105-*a* may compare the one or more performance metrics to one or more corresponding thresholds to determine whether the one or more performance metrics satisfy the one or more corresponding thresholds.

Additionally, or alternatively, at 320, the network entity 105-*a* may monitor one or more network performance metrics to determine whether the one or more network performance metrics satisfy a corresponding one or more thresholds.

At 325, the network entity 105-*a* may select an LCM operation to be performed by the UE 115-*b* for the ML model. The LCM operation may include deactivation of the ML model, switching from the ML model (e.g., to a different ML model or ML model-based functionality), falling back to a different ML model, or the like, among other examples. In some cases, the network entity 105-*a* may select the LCM operation based on the monitoring at 320, for example, if the network entity 105-*a* determines that the one or more performance metrics, or the one or more network performance metrics, fail to satisfy the one or more corresponding thresholds. In other cases, the network entity 105-*a* may select the LCM operation based on a network operation or network procedure, such as a transition to an energy-saving mode. For example, the network entity 105-*a* may select to deactivate the ML model at the UE 115-*b* if the network transitions to an energy-saving mode.

At 330, the network entity 105-*a* may transmit, and the UE 115-*b* may receive, a control message indicating the LCM operation selected at 325 for the UE 115-*b* to perform for the ML model. In response to receiving the control message at 330, the UE 115-*b* may perform the LCM operation for the ML model.

At 335, the network entity 105-*a* may transmit, and the UE 115-*b* may receive, a control message indicating a cause of the LCM operation indicated at 330. The indication of the cause of the LCM operation may indicate whether the LCM operation was based on the performance of the ML model (e.g., based on the one or more performance metrics failing to satisfy the one or more corresponding thresholds) or was based on another cause (e.g., the one or more network performance metrics failing to satisfy the corresponding one or more thresholds). For example, the control message may include a binary indication, where a first value of the binary indication represents that the LCM operation was triggered (e.g., caused) by the performance of the ML model and a second value of the binary indication corresponds to the network entity 105-*a* selecting the LCM operation for another reason, such as the network performance or a network operation or network procedure.

In some cases, the control message at 330 and the control message at 335 may be the same. That is, the network entity 105-*a* may transmit, and the UE 115-*b* may receive, a single control message including the indication of the LCM operation and including the indication of the cause for the LCM operation.

At 340, in some examples, the UE 115-*b* may generate a performance report associated with the performance of the ML model, e.g., based on (in response to) the indication of the LCM operation. The UE 115-*b* may map the cause of the LCM operation to the ML model to generate the performance report. For example, if the cause of the LCM operation is the performance of the ML model, the UE 115-*b* may identify which functionality, feature, or feature group is active at the time of reception of the control message at 335 to determine which functionality, feature, or feature group is associated with the performance. Additionally, or alternatively, the UE 115-*b* may identify which ML model(s) are associated with the active functionality, feature, or feature group. The UE 115-*b* may determine a frequency (e.g., occurrence rate) of one or more LCM operations performed for the ML model or the active functionality, feature, or feature group based on the mapping. For example, the UE 115-*b* may include, in the performance report, an indication of how often the UE 115-*b* has performed a given LCM operation (e.g., activation, deactivation, fallback) for the ML model. As another example, the UE 115-*b* may include, in the performance report, a list of ML models or functionalities to which the UE 115-*b* switched in accordance with an LCM operation, as well as how often the switching was performed.

At 345, the UE 115-*b* may transmit, and the server 130-*b* may receive, an indication of the performance report generated at 340. The server 130-*b* may decide to adjust or update the ML model based on the performance report. For example, if the performance report indicates relatively poor performance for the ML model, the server 130-*b* may adjust one or more parameters of the ML model configuration for the ML model. Additionally, or alternatively, the server 130-*b* may, at 350, retrain the ML model. If, however, the LCM operation was selected for a reason different from the performance of the ML model, the server 130-*b* may refrain from retraining or otherwise adjusting or updating the ML model.

At 355, in some examples, the server 130-*b* may transmit, and the UE 115-*b* may receive, an indication of an updated ML model configuration based on the performance report. For instance, if the server 130-*b* updates the ML model configuration or retrains the ML model at 350, the server 130-*b* may indicate the ML model configuration to the UE 115-*b*.

FIG. 4 shows an example of a process flow 400 that supports indicating causes for life cycle management operations in accordance with one or more aspects of the present disclosure. The process flow 400 may implement or be implemented to realize aspects of the wireless communications system 100 or the wireless communications system 200. For example, the process flow 400 illustrates a network in which a UE 115-*c*, a network entity 105-*c*, and a server 130-*c* may communicate, each of which may be examples of corresponding devices as described herein. In the process flow 400, the UE 115-*c* may support one or more ML models or ML model-based functionalities, which may be configured by the server 130-*c* and activated and managed by the network entity 105-*c*. The server 130-*c* may include or be an example of a UE server, an OAM, a training entity, a core network node, or any other type of device associated with the one or more ML models or ML model-based functionalities.

In the following description of the process flow 400, the operations may be performed (e.g., reported or provided) in a different order than the order shown, or the operations performed by the example devices may be performed in different orders or at different times. Additionally, although the process flow 400 is described with reference to the UE 115-*c*, the network entity 105-*c*, and the server 130-*c*, any type of device or combination of devices may perform the described operations. The example of the process flow 400 describes an ML model, but it is to be understood that the techniques described herein may be applicable to any type and quantity of ML, AI, or NN model, functionality, or feature. Some operations also may be omitted from the process flow 400, or other operations may be added to the process flow 400. Further, although some operations or signaling may be shown to occur at different times for discussion purposes, these operations may actually occur at the same time or otherwise concurrently.

At 405, the server 130-*c* may transmit, and the UE 115-*c* may receive, a message (e.g., a control message, such as an RRC message, MAC-CE, or the like) indicating an ML model configuration for an ML model at the UE 115-*c*. The ML model may be associated with an ML model ID and may be configured to perform a functionality at the UE 115-*c*. The functionality, in turn, may be associated with a functionality ID and a list of functionality parameters. In some cases, different features or feature groups may be defined for different ML models and ML model-based functionalities at the UE 115-*c*.

At 410, in some examples, the server 130-*c* may transmit, and the network entity 105-*c* may receive, control signaling indicating a report configuration for a performance report associated with the ML model at the UE 115-*c*. The report configuration may indicate one or more performance metrics associated with the ML model and monitored by the network entity 105-*c* for the network entity 105-*c* to include in the performance report. Additionally, or alternatively, the report configuration may indicate a time duration for the network entity 105-*c* to monitor the one or more performance metrics. In some cases, the report configuration may indicate one or more long-term statistics associated with the one or more performance metrics to be included in the performance report.

At 415, the network entity 105-*c* may activate the ML model at the UE 115-*c*. For example, the network entity 105-*c* may transmit, and the UE 115-*c* may receive, control signaling including an indication for the UE 115-*c* to activate the ML model. The control signaling may indicate the ML model ID, the functionality ID, or both.

At 420, the UE 115-*c* may activate (e.g., run) the ML model, e.g., based on receiving the control signaling at 410. If the control signaling indicates the functionality ID, the UE 115-*c* may determine and activate the ML model associated with (e.g., underlying) the functionality ID.

At 425, in some examples, the UE 115-*c* may transmit, and the network entity 105-*c* may receive, a message indicating the report configuration (e.g., as an alternative or in addition to the server 130-*c* indicating the report configuration at 410) for the performance report. In some examples, the message may include or be an example of a UAI message, an RRC message, or the like. The report configuration may indicate one or more performance metrics associated with the ML model and monitored by the network entity 105-*c* for the network entity 105-*c* to include in the performance report. Additionally, or alternatively, the report configuration may indicate a time duration for the network entity 105-*c* to monitor the one or more performance metrics. In some cases, the report configuration may indicate one or more long-term statistics associated with the one or more performance metrics to be included in the performance report.

At 430, the UE 115-*c* may transmit, and the network entity 105-*c* may receive, a message indicating a request for the performance report. In some examples, the message may include or be an example of a UAI message, an RRC message, or the like.

At 435, the network entity 105-*c* may monitor a performance of the ML model at the UE 115-*c* based on the request for the performance report, the report configuration, or both. The network entity 105-*c* may, for example, monitor (e.g., measure) the one or more performance metrics indicated in the report configuration, may collect data for calculating or otherwise determining the one or more long-term statistics indicated in the report configuration, or both, in accordance with the indicated time duration. In some cases, the network entity 105-*c* may compare the one or more performance metrics to one or more corresponding thresholds to determine whether the one or more performance metrics satisfy the one or more corresponding thresholds.

At 440, the network entity 105-*c* may select an LCM operation to be performed by the UE 115-*c* for the ML model. The LCM operation may include deactivation of the ML model, switching from the ML model (e.g., to a different ML model or ML model-based functionality), falling back to a different ML model, or the like, among other examples. In some cases, the network entity 105-*c* may select the LCM operation based on the monitoring at 435, for example, if the network entity 105-*c* determines that the one or more performance metrics fail to satisfy the one or more corresponding thresholds. In other cases, the network entity 105-*c* may select the LCM operation based on a network operation or network procedure, such as a transition to an energy-saving mode, or based on a performance of the network. For example, the network entity 105-*c* may select to deactivate the ML model at the UE 115-*c* if the network transitions to an energy-saving mode or if the network becomes over-loaded.

At 445, the network entity 105-*c* may generate an LCM report that indicates a cause (e.g., a reason) for the LCM operation selected at 440. In some cases, such as when the network entity 105-*c* selects the LCM operation based on the performance of the ML model, the LCM report may include or be an example of the performance report associated with the report configuration and the request for the performance report. In such cases, the network entity 105-*c* may generate the LCM report in accordance with the report configuration and based on receiving the request. The network entity 105-*c* may include, in the performance report, timing information, such as a time duration during which the network entity 105-*c* observed the one or more performance metrics failing to satisfy the one or more corresponding thresholds. Additionally, or alternatively, the performance report may indicate a respective value or quantity associated with each performance metric, such as a quantity by which a performance metric failed to satisfy a threshold. In some examples, the performance report may indicate a relative or qualitative indication of the performance of the ML model, such as whether the performance was relatively poor.

In some cases, the network entity 105-*c* may include, in the performance report, the one or more long-term statistics associated with the LCM operation and the performance of the ML model. Here, the one or more long-term statistics may be collected or calculated by the network entity 105-*c* over a time duration, e.g., as indicated in the report configuration. For instance, the one or more long-term statistics may include an occurrence rate at which the network entity 105-*c* indicates, and the UE 115-*c* performs, an LCM operation for the ML model within the time duration, as well as an occurrence rate associated with the reason for the LCM operation. As another example, the one or more long-term statistics may include statistical values associated with the one or more performance metrics, such as a mean and variance of a performance degradation of the ML model occurring when the network entity 105-*c* determines (e.g., is triggered) to select the LCM operation. When the LCM operation is a switch or fallback to a different ML model, the one or more long-term statistics may include a list of ML models or functionalities to which the UE 115-*c* switched during the time duration and an indication of how often the switching occurred (e.g., an occurrence rate for the switching). In some cases, the one or more long-term statistics may be per feature or per feature group associated with the ML model.

Alternatively, when the network entity 105-*c* selects the LCM operation for a reason different from the performance of the ML model, the network entity 105-*c* may indicate the reason in the LCM report. For instance, the network entity 105-*c* may indicate that the LCM operation was selected based on the network being overloaded or based on the network operating in an energy-saving mode, among other examples.

At 450, the network entity 105-*c* may transmit, and the UE 115-*c* may receive, a control message indicating the LCM operation selected at 440 for the UE 115-*c* to perform for the ML model. In response to receiving the control message at 450, the UE 115-*c* may perform the LCM operation for the ML model.

At 455, the network entity 105-*c* may transmit, and the UE 115-*c* may receive, a control message indicating the LCM report. The LCM report may indicate whether the LCM operation was based on the performance of the ML model (e.g., based on the one or more performance metrics failing to satisfy the one or more corresponding thresholds) or was based on another cause (e.g., the network procedure or the network performance). For example, the LCM report may include or be an example of the performance report. In some cases, the network entity 105-*c* my transmit the LCM report using a signaling radio bearer (SRB), such as an SRB2, an SRB4, an SRBX, or the like, among other examples.

In some cases, the control message at 450 and the control message at 455 may be the same. That is, the network entity 105-*c* may transmit, and the UE 115-*c* may receive, a single control message including the indication of the LCM operation and including the LCM report.

At 460, in some examples, the network entity 105-*c* may transmit, and the server 130-*c* may receive, the LCM report.

At 465, the UE 115-*c* may transmit, and the server 130-*c* may receive, an indication of the LCM report. That is, the UE 115-*c* may receive a first instance of the LCM report from the network entity 105-*c* at 455 and may forward, to the server 130-*c*, a second instance of the LCM report.

At 470, in some cases, the server 130-*c* may decide to adjust or update the ML model based on the LCM report. For example, if the LCM report indicates relatively poor performance for the ML model, the server 130-*c* may adjust one or more parameters of the ML model configuration for the ML model. Additionally, or alternatively, the server 130-*c* may, at 450, retrain the ML model. If, however, the LCM operation was selected for a reason different from the performance of the ML model, the server 130-*c* may refrain from retraining or otherwise adjusting or updating the ML model.

At 475, in some examples, the server 130-*c* may transmit, and the UE 115-*c* may receive, an indication of an updated ML model configuration based on the LCM report. For instance, if the server 130-*c* updates the ML model configuration or retrains the ML model at 470, the server 130-*c* may indicate the updated ML model configuration to the UE 115-*c*.

Figure 5:
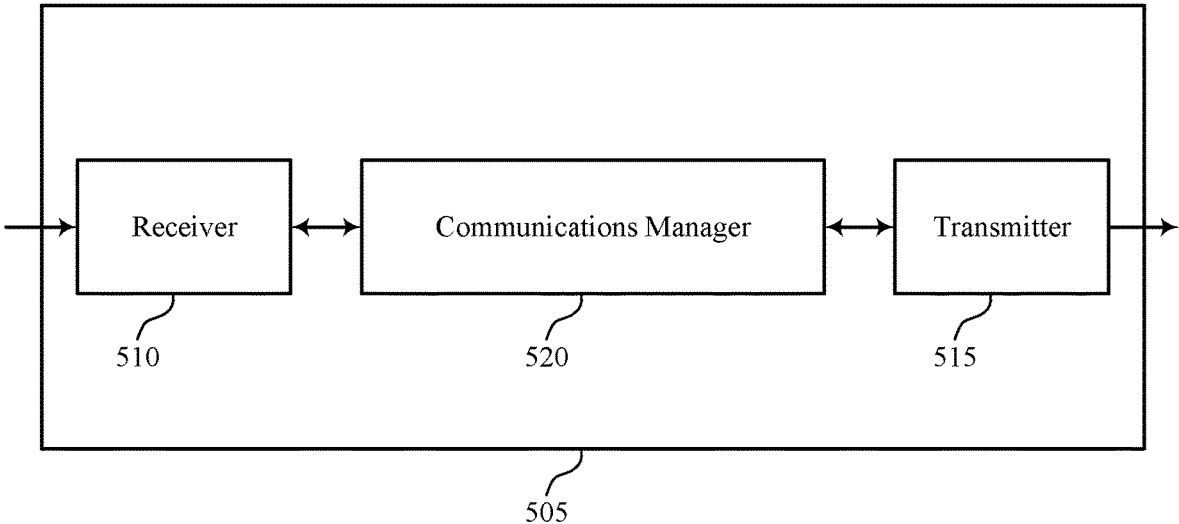
FIGS. 5 and 6 show block diagrams of devices that support indicating causes for LCM operations in accordance with one or more aspects of the present disclosure.

FIG. 5 shows a block diagram 500 of a device 505 that supports indicating causes for LCM operations in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to indicating causes for LCM operations). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to indicating causes for LCM operations). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of indicating causes for LCM operations as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with examples as disclosed herein. For example, the communications manager 520 is capable of, configured to, or operable to support a means for receiving one or more control messages that indicate an LCM operation for an ML model or ML model-based functionality associated with the UE, where the one or more control messages include an indication of whether the LCM operation is based on a performance of the ML model or ML model-based functionality. The communications manager 520 is capable of, configured to, or operable to support a means for performing the LCM operation for the ML model or ML model-based functionality based on the one or more control messages.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for reduced processing and signaling overhead associated with ML models or ML model-based functionalities. For example, the device 505 may utilize received information about an LCM operation for an ML model or ML model-based functionality to determine whether the performance of the ML model or ML model-based functionality is adequate. If the LCM operation is selected because of a network operation or network performance, the device 505 may refrain from retraining or otherwise updating the ML model or ML model-based functionality, which may conserve power and reduce processing. The device 505 may additionally reduce signaling overhead associated with communicating with a server associated with the ML model or ML model-based functionality.

Figure 6:
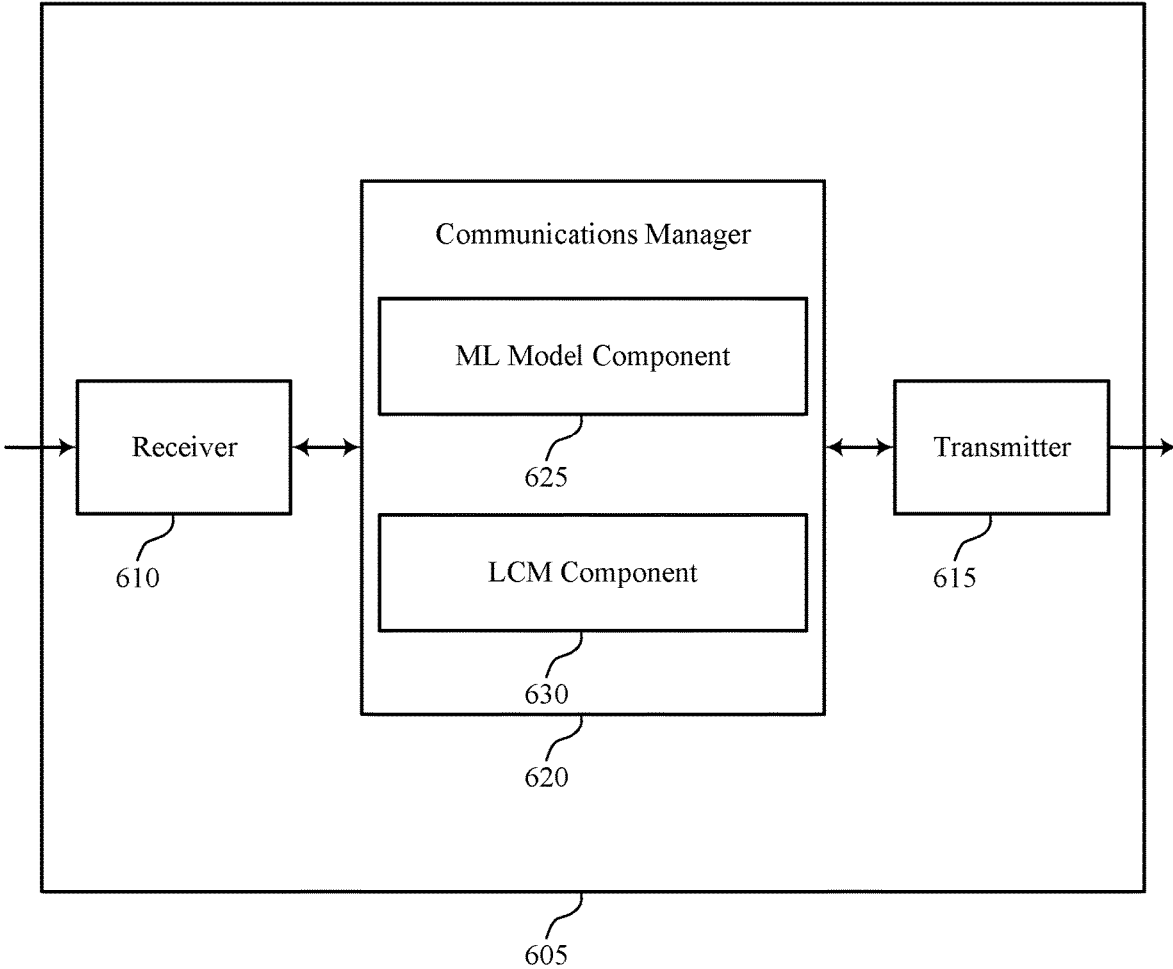

FIG. 6 shows a block diagram 600 of a device 605 that supports indicating causes for LCM operations in accordance with one or more aspects of the present disclosure. The device 605 may be an example of aspects of a device 505 or a UE 115 as described herein. The device 605 may include a receiver 610, a transmitter 615, and a communications manager 620. The device 605, or one of more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to indicating causes for LCM operations). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to indicating causes for LCM operations). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of indicating causes for LCM operations as described herein. For example, the communications manager 620 may include an ML model component 625 an LCM component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication in accordance with examples as disclosed herein. The ML model component 625 is capable of, configured to, or operable to support a means for receiving one or more control messages that indicate an LCM operation for an ML model or ML model-based functionality associated with the UE, where the one or more control messages include an indication of whether the LCM operation is based on a performance of the ML model or ML model-based functionality. The LCM component 630 is capable of, configured to, or operable to support a means for performing the LCM operation for the ML model or ML model-based functionality based on the one or more control messages.

Figure 7:
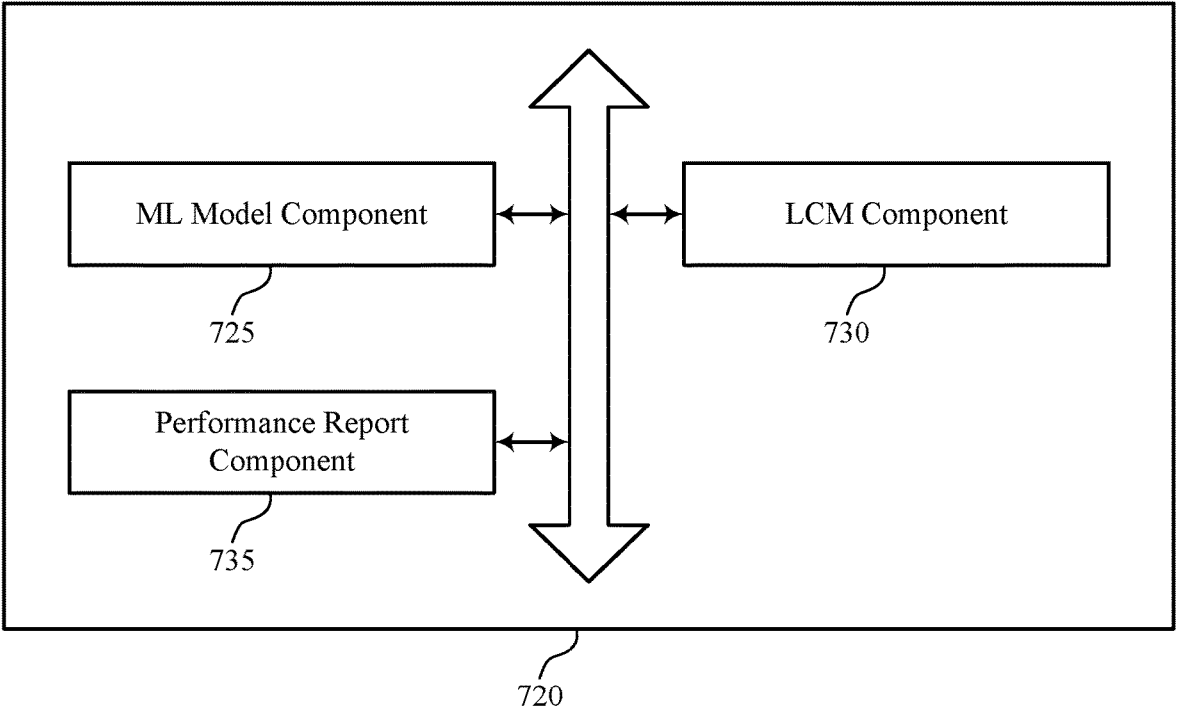
FIG. 7 shows a block diagram of a communications manager that supports indicating causes for LCM operations in accordance with one or more aspects of the present disclosure.

FIG. 7 shows a block diagram 700 of a communications manager 720 that supports indicating causes for LCM operations in accordance with one or more aspects of the present disclosure. The communications manager 720 may be an example of aspects of a communications manager 520, a communications manager 620, or both, as described herein. The communications manager 720, or various components thereof, may be an example of means for performing various aspects of indicating causes for LCM operations as described herein. For example, the communications manager 720 may include an ML model component 725, an LCM component 730, a performance report component 735, or any combination thereof. Each of these components, or components or subcomponents thereof (e.g., one or more processors, one or more memories), may communicate, directly or indirectly, with one another (e.g., via one or more buses).

The communications manager 720 may support wireless communication in accordance with examples as disclosed herein. The ML model component 725 is capable of, configured to, or operable to support a means for receiving one or more control messages that indicate an LCM operation for an ML model or ML model-based functionality associated with the UE, where the one or more control messages include an indication of whether the LCM operation is based on a performance of the ML model or ML model-based functionality. The LCM component 730 is capable of, configured to, or operable to support a means for performing the LCM operation for the ML model or ML model-based functionality based on the one or more control messages.

In some examples, the indication further includes a cause of the LCM operation, the cause including at least one of the performance of the ML model or ML model-based functionality, a network associated with the UE being overloaded, and a network associated with the UE transitioning to an energy-saving mode.

In some examples, the indication further includes a performance report for the ML model or ML model-based functionality based on the LCM operation. In some examples, the performance report component 735 is capable of, configured to, or operable to support a means for transmitting, to a network entity, a message including a request for the performance report, where receiving the one or more control messages is based on the request. In some examples, the performance report component 735 is capable of, configured to, or operable to support a means for transmitting, within the message, an indication of one or more parameters for the performance report, the one or more parameters including one or more performance metrics associated with the ML model or ML model-based functionality that are to be included in the performance report, a time duration for the network entity to monitor the one or more performance metrics, or a combination thereof.

In some examples, the performance report component 735 is capable of, configured to, or operable to support a means for transmitting the performance report to a server associated with the ML model or ML model-based functionality based on receiving the one or more control messages. In some examples, the performance report component 735 is capable of, configured to, or operable to support a means for receiving the performance report from a network entity, where transmitting the performance report is based on receiving the performance report.

In some examples, the performance report includes at least one of an indication of one or more performance metrics associated with the ML model or ML model-based functionality, an indication of a time duration during which the one or more performance metrics were monitored, an indication of a network operation that triggered the LCM operation, an indication of a network performance metric that triggered the LCM operation, or a combination thereof.

In some examples, the performance report includes one or more statistics corresponding to the performance of the ML model or ML model-based functionality for a time duration, the one or more statistics including an indication of an occurrence rate of LCM operations for the ML model or ML model-based functionality, a mapping between the performance of the ML model or ML model-based functionality and a set of LCM operations including the LCM operation, a list of one or more ML models or ML model-based functionalities to which the UE switched in accordance with the LCM operation, an indication of a respective occurrence rate associated with the UE switching to each ML model or ML model-based functionality of the one or more ML models or ML model-based functionalities, or a combination thereof.

In some examples, the performance report component 735 is capable of, configured to, or operable to support a means for generating a performance report for the ML model or ML model-based functionality based on the indication that the LCM operation is based on the performance of the ML model or ML model-based functionality, the performance report including an identifier of the ML model or ML model-based functionality based on the ML model or ML model-based functionality being active when the one or more control messages are received, an indication of a functionality of the ML model based on the functionality being active when the one or more control messages are received, an occurrence rate of LCM operations for the ML model or ML model-based functionality, a list of one or more ML models or ML model-based functionalities to which the UE switched in accordance with the LCM operation, or a combination thereof.

In some examples, the performance report component 735 is capable of, configured to, or operable to support a means for transmitting the performance report to a server associated with the ML model or ML model-based functionality based on receiving the one or more control messages.

In some examples, the indication includes a single bit. In some examples, a first value of the bit corresponds to an indication that the LCM operation is based on the performance of the ML model or ML model-based functionality. In some examples, a second value of the bit corresponds to an indication that the LCM operation is based on a performance metric of a network to which the UE belongs.

In some examples, the LCM operation includes at least one of activation of the ML model or ML model-based functionality, deactivation of the ML model or ML model-based functionality, a fallback to the ML model or ML model-based functionality, and a switch to the ML model or ML model-based functionality.

In some examples, the indication includes information about a decision, by a network entity, to indicate the LCM operation to the UE.

Figure 8:
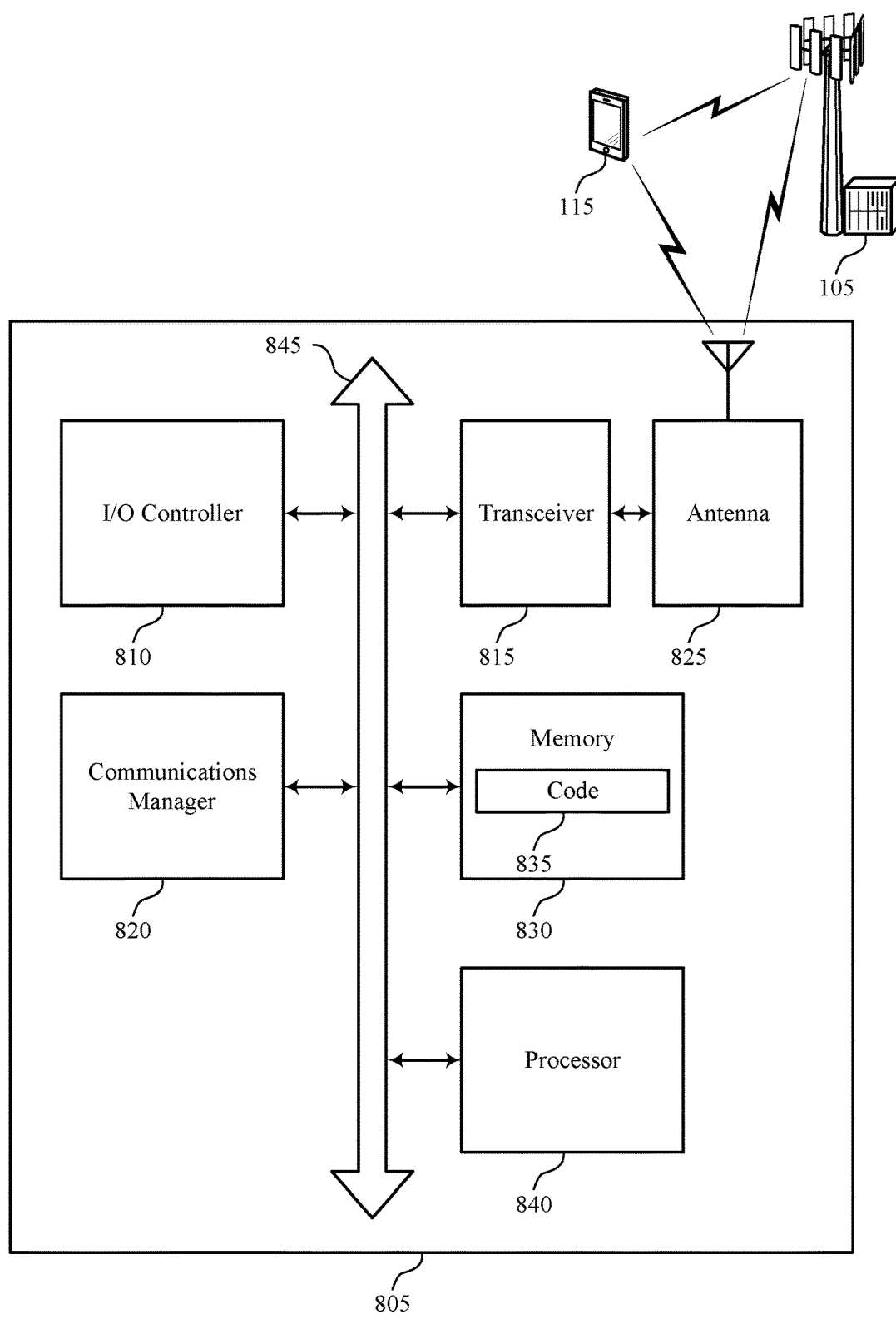
FIG. 8 shows a diagram of a system including a device that supports indicating causes for LCM operations in accordance with one or more aspects of the present disclosure.

FIG. 8 shows a diagram of a system 800 including a device 805 that supports indicating causes for LCM operations in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting indicating causes for LCM operations). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein.

The communications manager 820 may support wireless communication in accordance with examples as disclosed herein. For example, the communications manager 820 is capable of, configured to, or operable to support a means for receiving one or more control messages that indicate an LCM operation for an ML model or ML model-based functionality associated with the UE, where the one or more control messages include an indication of whether the LCM operation is based on a performance of the ML model or ML model-based functionality. The communications manager 820 is capable of, configured to, or operable to support a means for performing the LCM operation for the ML model or ML model-based functionality based on the one or more control messages.

By including or configuring the communications manager 820 in accordance with examples as described herein, the device 805 may support techniques for improved utilization of processing capabilities and reduced power consumption associated with ML models or ML model-based functionalities. For example, the device 805 may utilize received information about an LCM operation for an ML model or ML model-based functionality to determine whether the performance of the ML model or ML model-based functionality is adequate. If the LCM operation is selected because of a network operation or network performance, the device 805 may refrain from retraining or otherwise updating the ML model or ML model-based functionality, which may conserve power and reduce processing. The device 805 may additionally reduce signaling overhead associated with communicating with a server associated with the ML model or ML model-based functionality.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of indicating causes for LCM operations as described herein, or the at least one processor 840 and the at least one memory 830 may be otherwise configured to, individually or collectively, perform or support such operations.

Figure 9:
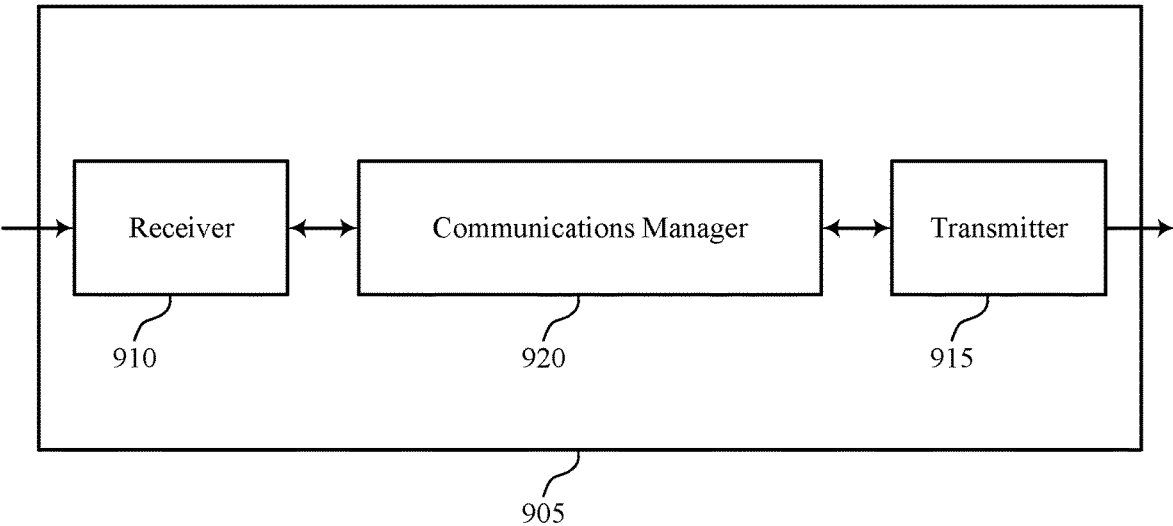
FIGS. 9 and 10 show block diagrams of devices that support indicating causes for life cycle management operations in accordance with one or more aspects of the present disclosure.

FIG. 9 shows a block diagram 900 of a device 905 that supports indicating causes for LCM operations in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of indicating causes for LCM operations as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. For example, the communications manager 920 is capable of, configured to, or operable to support a means for selecting an LCM operation to be performed by a UE for an ML model or ML model-based functionality at the UE. The communications manager 920 is capable of, configured to, or operable to support a means for transmitting, to the UE, one or more control messages that indicate the LCM operation for the ML model or ML model-based functionality, where the one or more control messages include an indication of whether the LCM operation is based on a performance of the ML model or ML model-based functionality.

Additionally, or alternatively, the communications manager 920 may support wireless communication in accordance with examples as disclosed herein. For example, the communications manager 920 is capable of, configured to, or operable to support a means for transmitting, to a UE, an ML model configuration for an ML model or ML model-based functionality of the UE. The communications manager 920 is capable of, configured to, or operable to support a means for receiving a performance report associated with the ML model or ML model-based functionality based on an LCM operation for the ML model or ML model-based functionality, the performance report indicating one or more performance metrics associated with a performance of the ML model or ML model-based functionality. The communications manager 920 is capable of, configured to, or operable to support a means for updating the ML model or ML model-based functionality based on the performance report.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for reduced processing and power consumption associated with ML models or ML model-based functionalities. For example, the device 905 may monitor the performance of an ML model or ML model-based functionality at a UE, and if the performance fails to satisfy a threshold, the device 905 may select an appropriate LCM operation for the ML model or ML model-based functionality. Alternatively, the device 905 may select the LCM operation based on a network operation or a network performance metric. The device 905 may provide the UE (and, in some cases, a server associated with the ML model or ML model-based functionality) with information about the selection of the LCM, which may enable the UE to reduce processing and power consumption. By managing the ML model or ML model-based functionality at the UE, the device 905 may reduce processing and power consumption at the UE.

Figure 10:
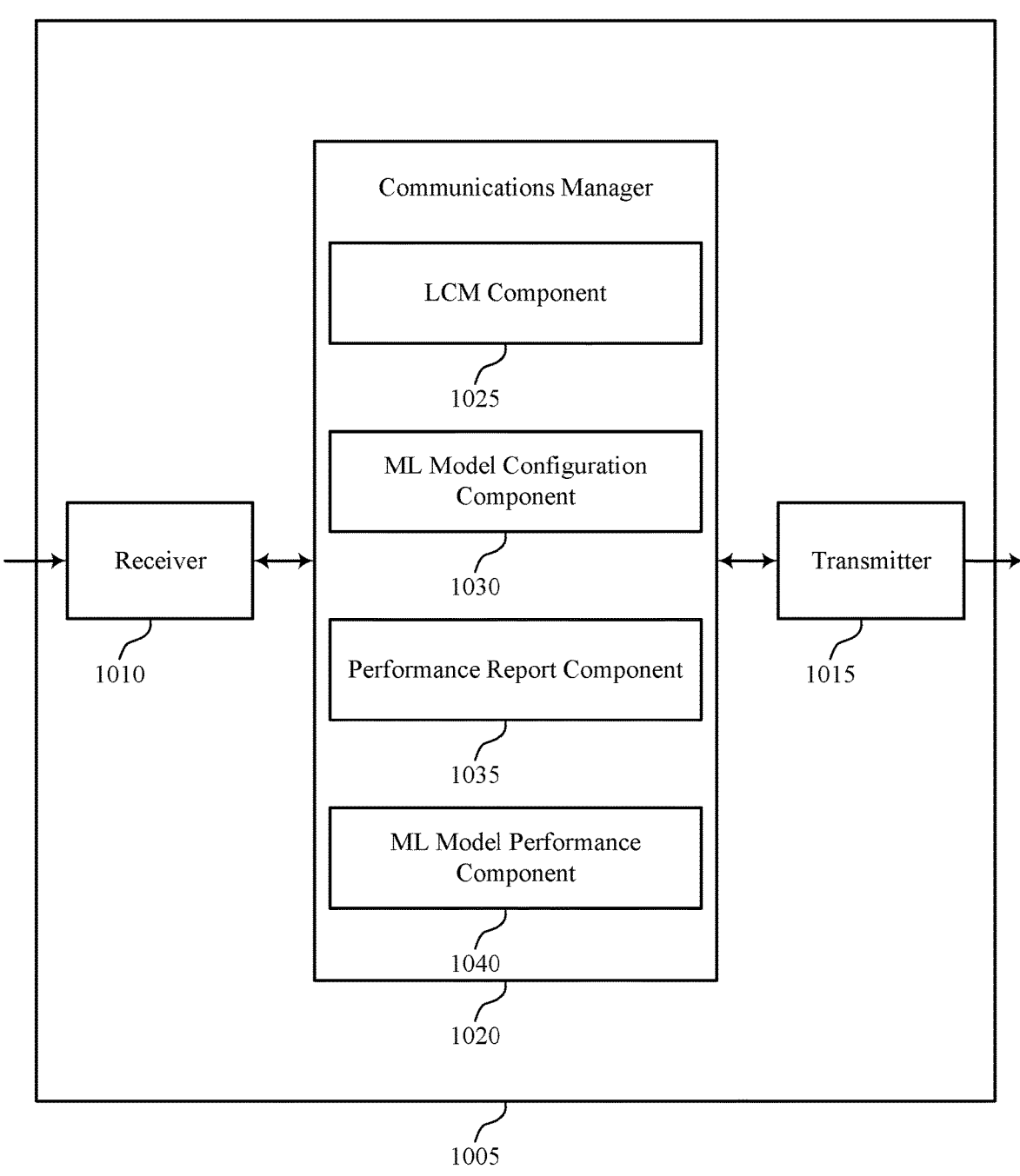

FIG. 10 shows a block diagram 1000 of a device 1005 that supports indicating causes for LCM operations in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one of more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) informa-tion generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of indicating causes for LCM operations as described herein. For example, the communications manager 1020 may include an LCM component 1025, an ML model configuration component 1030, a performance report component 1035, an ML model performance component 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication in accordance with examples as disclosed herein. The LCM component 1025 is capable of, configured to, or operable to support a means for selecting an LCM operation to be performed by a UE for an ML model or ML model-based functionality at the UE. The LCM component 1025 is capable of, configured to, or operable to support a means for transmitting, to the UE, one or more control messages that indicate the LCM operation for the ML model or ML model-based functionality, where the one or more control messages include an indication of whether the LCM operation is based on a performance of the ML model or ML model-based functionality.

Additionally, or alternatively, the communications manager 1020 may support wireless communication in accordance with examples as disclosed herein. The ML model configuration component 1030 is capable of, configured to, or operable to support a means for transmitting, to a UE, an ML model configuration for an ML model or ML model-based functionality of the UE. The performance report component 1035 is capable of, configured to, or operable to support a means for receiving a performance report associated with the ML model or ML model-based functionality based on an LCM operation for the ML model or ML model-based functionality, the performance report indicating one or more performance metrics associated with a performance of the ML model or ML model-based functionality. The ML model performance component 1040 is capable of, configured to, or operable to support a means for updating the ML model or ML model-based functionality based on the performance report.

Figure 11:
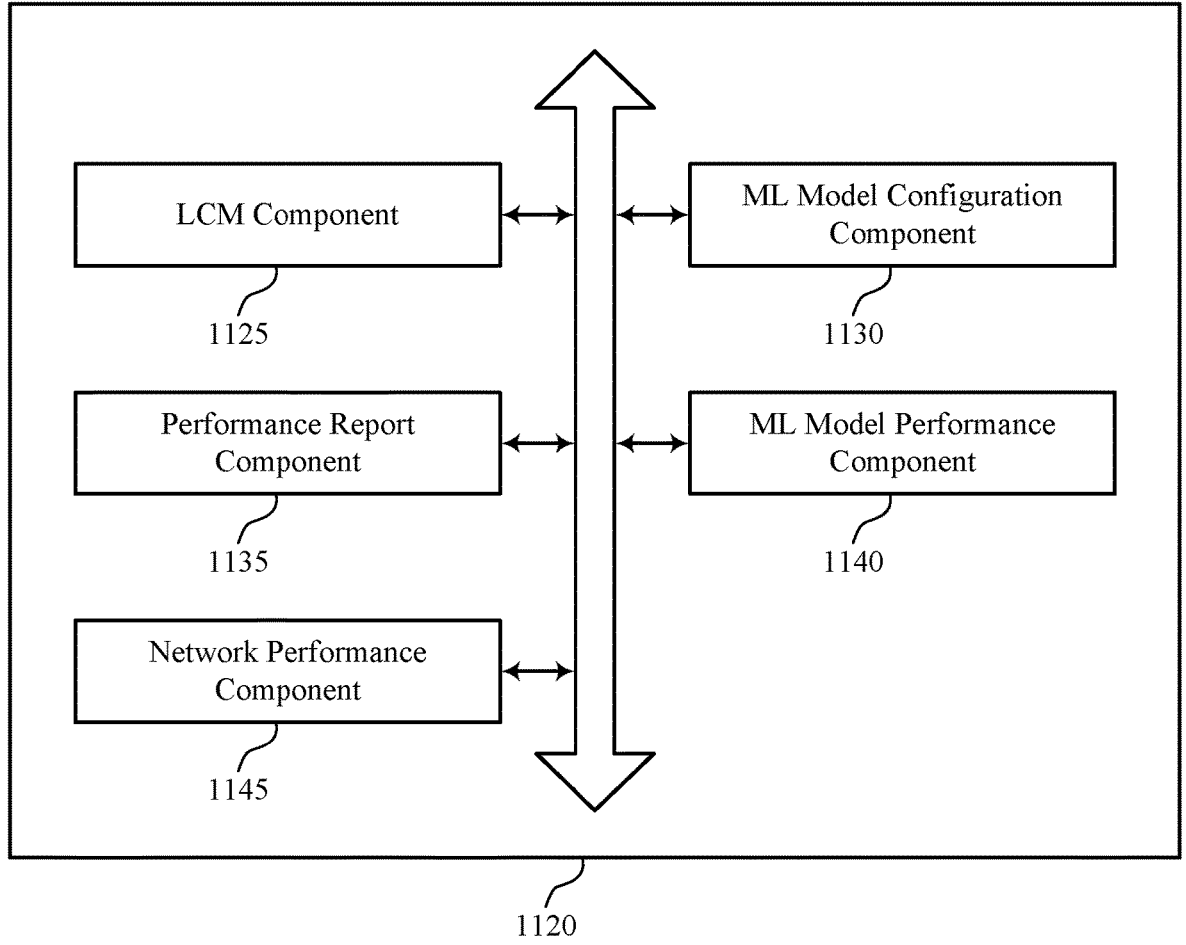
FIG. 11 shows a block diagram of a communications manager that supports indicating causes for life cycle management operations in accordance with one or more aspects of the present disclosure.

FIG. 11 shows a block diagram 1100 of a communications manager 1120 that supports indicating causes for LCM operations in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of indicating causes for LCM operations as described herein. For example, the communications manager 1120 may include an LCM component 1125, an ML model configuration component 1130, a performance report component 1135, an ML model performance component 1140, a network performance component 1145, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication in accordance with examples as disclosed herein. The LCM component 1125 is capable of, configured to, or operable to support a means for selecting an LCM operation to be performed by a UE for an ML model or ML model-based functionality at the UE. In some examples, the LCM component 1125 is capable of, configured to, or operable to support a means for transmitting, to the UE, one or more control messages that indicate the LCM operation for the ML model or ML model-based functionality, where the one or more control messages include an indication of whether the LCM operation is based on a performance of the ML model or ML model-based functionality.

In some examples, the ML model performance component 1140 is capable of, configured to, or operable to support a means for monitoring one or more performance metrics associated with the performance of the ML model or ML model-based functionality, where the LCM operation is selected based on the one or more performance metrics, and where the one or more control messages include the indication that the LCM operation is based on the performance of the ML model or ML model-based functionality.

In some examples, the network performance component 1145 is capable of, configured to, or operable to support a means for monitoring one or more network performance metrics associated with a network to which the network entity and the UE belong, where the LCM operation is selected based on the one or more network performance metrics, and where the one or more control messages include the indication that the LCM operation is based on the one or more network performance metrics.

In some examples, the LCM operation is selected in accordance with a decision, by a network associated with the network entity and the UE, to operate in an energy-saving mode. In some examples, the one or more control messages include the indication that the LCM operation is based on the decision.

In some examples, to support transmitting the one or more control messages, the performance report component 1135 is capable of, configured to, or operable to support a means for generating a performance report for the ML model or ML model-based functionality based on the LCM operation. In some examples, to support transmitting the one or more control messages, the performance report component 1135 is capable of, configured to, or operable to support a means for transmitting the indication including the performance report.

In some examples, the performance report component 1135 is capable of, configured to, or operable to support a means for receiving a message including a request for the performance report, where transmitting the one or more control messages is based on the request.

In some examples, the performance report component 1135 is capable of, configured to, or operable to support a means for receiving a message indicating one or more parameters for the performance report, the one or more parameters including one or more performance metrics associated with the ML model or ML model-based functionality that are to be included in the performance report, a time duration for the network entity to monitor the one or more performance metrics, or a combination thereof, where the indication including the performance report is transmitted in accordance with the one or more parameters.

In some examples, the performance report component 1135 is capable of, configured to, or operable to support a means for transmitting the performance report to a server associated with the ML model or ML model-based functionality based on transmitting the one or more control messages.

In some examples, the performance report includes at least one of an indication of one or more performance metrics associated with the ML model or ML model-based functionality, an indication of a time duration during which the one or more performance metrics were monitored, an indication of a network operation that triggered the LCM operation, an indication of a network performance metric that triggered the LCM operation, or a combination thereof.

In some examples, the performance report includes one or more statistics corresponding to the performance of the ML model or ML model-based functionality for a time duration, the one or more statistics including an indication of an occurrence rate of LCM operations for the ML model or ML model-based functionality, a mapping between the performance of the ML model or ML model-based functionality and a set of LCM operations including the LCM operation, a list of one or more ML models or ML model-based functionalities to which the UE switched in accordance with the LCM operation, an indication of a respective occurrence rate associated with the UE switching to each ML model or ML model-based functionality of the one or more ML models or ML model-based functionalities, or a combination thereof.

In some examples, the indication includes a single bit. In some examples, a first value of the bit corresponds to an indication that the LCM operation is based on the performance of the ML model or ML model-based functionality. In some examples, a second value of the bit corresponds to an indication that the LCM operation is based on a performance metric of a network to which the UE belongs.

In some examples, the LCM operation includes at least one of activation of the ML model or ML model-based functionality, deactivation of the ML model or ML model-based functionality, a fallback to the ML model or ML model-based functionality, and a switch to the ML model or ML model-based functionality.

Additionally, or alternatively, the communications manager 1120 may support wireless communication in accordance with examples as disclosed herein. The ML model configuration component 1130 is capable of, configured to, or operable to support a means for transmitting, to a UE, an ML model configuration for an ML model or ML model-based functionality of the UE. The performance report component 1135 is capable of, configured to, or operable to support a means for receiving a performance report associated with the ML model or ML model-based functionality based on an LCM operation for the ML model or ML model-based functionality, the performance report indicating one or more performance metrics associated with a performance of the ML model or ML model-based functionality. The ML model performance component 1140 is capable of, configured to, or operable to support a means for updating the ML model or ML model-based functionality based on the performance report.

In some examples, the performance report component 1135 is capable of, configured to, or operable to support a means for transmitting, to a network entity, a message including a request for the performance report, where the performance report is received from the network entity based on the request.

In some examples, the performance report component 1135 is capable of, configured to, or operable to support a means for transmitting, within the message, an indication of one or more parameters for the performance report, the one or more parameters including one or more performance metrics associated with the ML model or ML model-based functionality that are to be included in the performance report, a time duration for the network entity to monitor the one or more performance metrics, or a combination thereof.

In some examples, the performance report includes at least one of an indication of one or more performance metrics associated with the ML model or ML model-based functionality, an indication of a time duration during which the one or more performance metrics were monitored, an indication of a network operation that triggered the LCM operation, an indication of a network performance metric that triggered the LCM operation, or a combination thereof.

In some examples, the performance report includes one or more statistics corresponding to the performance of the ML model or ML model-based functionality for a time duration, the one or more statistics including an indication of an occurrence rate of LCM operations for the ML model or ML model-based functionality, a mapping between the performance of the ML model and a set of LCM operations including the LCM operation, a list of one or more ML models or ML model-based functionalities to which the UE switched in accordance with the LCM operation, an indication of a respective occurrence rate associated with the UE switching to each ML model or ML model-based functionality of the one or more ML models or ML model-based functionalities, or a combination thereof.

In some examples, to support receiving the performance report, the performance report component 1135 is capable of, configured to, or operable to support a means for receiving the performance report from the UE, the performance report including an identifier of the ML model or ML model-based functionality, an indication of a functionality of the ML model or ML model-based functionality, an occurrence rate of LCM operations for the ML model or ML model-based functionality, a list of one or more ML models or ML model-based functionalities to which the UE switched in accordance with the LCM operation, or a combination thereof.

In some examples, the ML model performance component 1140 is capable of, configured to, or operable to support a means for retraining the ML model or ML model-based functionality based on the performance report.

Figure 12:
FIG. 12 shows a diagram of a system including a device that supports indicating causes for LCM operations in accordance with one or more aspects of the present disclosure.

FIG. 12 shows a diagram of a system 1200 including a device 1205 that supports indicating causes for LCM operations in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting indicating causes for LCM operations). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some implementations, the at least one processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the at least one processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication in accordance with examples as disclosed herein. For example, the communications manager 1220 is capable of, configured to, or operable to support a means for selecting an LCM operation to be performed by a UE for an ML model or ML model-based functionality at the UE. The communications manager 1220 is capable of, configured to, or operable to support a means for transmitting, to the UE, one or more control messages that indicate the LCM operation for the ML model or ML model-based functionality, where the one or more control messages include an indication of whether the LCM operation is based on a performance of the ML model or ML model-based functionality.

Additionally, or alternatively, the communications manager 1220 may support wireless communication in accordance with examples as disclosed herein. For example, the communications manager 1220 is capable of, configured to, or operable to support a means for transmitting, to a UE, an ML model configuration for an ML model or ML model-based functionality of the UE. The communications manager 1220 is capable of, configured to, or operable to support a means for receiving a performance report associated with the ML model or ML model-based functionality based on an LCM operation for the ML model or ML model-based functionality, the performance report indicating one or more performance metrics associated with a performance of the ML model or ML model-based functionality. The communications manager 1220 is capable of, configured to, or operable to support a means for updating the ML model or ML model-based functionality based on the performance report.

By including or configuring the communications manager 1220 in accordance with examples as described herein, the device 1205 may support techniques for reduced processing and improved performance associated with ML models or ML model-based functionalities. For example, the device 1205 may monitor the performance of an ML model or ML model-based functionality at a UE, and if the performance fails to satisfy a threshold, the device 1205 may select an appropriate LCM operation for the ML model or ML model-based functionality. Alternatively, the device 1205 may select the LCM operation based on a network operation or a network performance metric. The device 1205 may provide the UE (and, in some cases, a server associated with the ML model or ML model-based functionality) with information about the selection of the LCM, which may enable the UE to reduce processing and power consumption. By managing the ML model or ML model-based functionality at the UE, the device 1205 may reduce processing and power consumption at the UE. Further, the device 1205 may support improved performance and efficiency, for example, by deactivating the ML model or ML model-based functionality or switching to a different ML model or ML model-based functionality when the performance fails to satisfy the threshold.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of indicating causes for LCM operations as described herein, or the at least one processor 1235 and the at least one memory 1225 may be otherwise configured to, individually or collectively, perform or support such operations.

FIG. 13 shows a flowchart illustrating a method 1300 that supports indicating causes for LCM operations in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving one or more control messages that indicate an LCM operation for an ML model or ML model-based functionality associated with the UE, where the one or more control messages include an indication of whether the LCM operation is based on a performance of the ML model or ML model-based functionality. The operations of block 1305 may be performed in accordance with examples as disclosed herein. In some examples, aspects of the operations of 1305 may be performed by an ML model component 725 as described with reference to FIG. 7.

At 1310, the method may include performing the LCM operation for the ML model or ML model-based functionality based on the one or more control messages. The operations of block 1310 may be performed in accordance with examples as disclosed herein. In some examples, aspects of the operations of 1310 may be performed by an LCM component 730 as described with reference to FIG. 7.

FIG. 14 shows a flowchart illustrating a method 1400 that supports indicating causes for LCM operations in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving one or more control messages that indicate an LCM operation for an ML model or ML model-based functionality associated with the UE, where the one or more control messages include an indication of whether the LCM operation is based on a performance of the ML model or ML model-based functionality. The operations of block 1405 may be performed in accordance with examples as disclosed herein. In some examples, aspects of the operations of 1405 may be performed by an ML model component 725 as described with reference to FIG. 7.

At 1410, the method may include generating a performance report for the ML model or ML model-based functionality based on the indication that the LCM operation is based on the performance of the ML model or ML model-based functionality, the performance report including an identifier of the ML model or ML model-based functionality based on the ML model or ML model-based functionality being active when the one or more control messages are received, an indication of a functionality of the ML model based on the functionality being active when the one or more control messages are received, an occurrence rate of LCM operations for the ML model or ML model-based functionality, a list of one or more ML models or ML model-based functionalities to which the UE switched in accordance with the LCM operation, or a combination thereof. The operations of block 1410 may be performed in accordance with examples as disclosed herein. In some examples, aspects of the operations of 1410 may be performed by a performance report component 735 as described with reference to FIG. 7.

At 1415, the method may include transmitting the performance report to a server associated with the ML model or ML model-based functionality based on receiving the one or more control messages. The operations of block 1415 may be performed in accordance with examples as disclosed herein. In some examples, aspects of the operations of 1415 may be performed by a performance report component 735 as described with reference to FIG. 7.

At 1420, the method may include performing the LCM operation for the ML model or ML model-based functionality based on the one or more control messages. The operations of block 1420 may be performed in accordance with examples as disclosed herein. In some examples, aspects of the operations of 1420 may be performed by an LCM component 730 as described with reference to FIG. 7.

FIG. 15 shows a flowchart illustrating a method 1500 that supports indicating causes for LCM operations in accordance with aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include selecting an LCM operation to be performed by a UE for an ML model or ML model-based functionality at the UE. The operations of block 1505 may be performed in accordance with examples as disclosed herein. In some examples, aspects of the operations of 1505 may be performed by an LCM component 1125 as described with reference to FIG. 11.

At 1510, the method may include transmitting, to the UE, one or more control messages that indicate the LCM operation for the ML model or ML model-based functionality, where the one or more control messages include an indication of whether the LCM operation is based on a performance of the ML model or ML model-based functionality. The operations of block 1510 may be performed in accordance with examples as disclosed herein. In some examples, aspects of the operations of 1510 may be performed by an LCM component 1125 as described with reference to FIG. 11.

FIG. 16 shows a flowchart illustrating a method 1600 that supports indicating causes for LCM operations in accordance with aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include monitoring one or more performance metrics associated with a performance of an ML model or ML model-based functionality at a UE. The operations of block 1605 may be performed in accordance with examples as disclosed herein. In some examples, aspects of the operations of 1605 may be performed by an ML model performance component 1140 as described with reference to FIG. 11.

At 1610, the method may include selecting an LCM operation to be performed by the UE for the ML model or ML model-based functionality at the UE, where the LCM operation is selected based on the one or more performance metrics. The operations of block 1610 may be performed in accordance with examples as disclosed herein. In some examples, aspects of the operations of 1610 may be performed by an LCM component 1125 as described with reference to FIG. 12.

At 1615, the method may include generating a performance report for the ML model or ML model-based functionality based on the LCM operation. The operations of block 1615 may be performed in accordance with examples as disclosed herein. In some examples, aspects of the operations of 1615 may be performed by a performance report component 1135 as described with reference to FIG. 11.

At 1620, the method may include transmitting, to the UE, one or more control messages that indicate the LCM operation for the ML model or ML model-based functionality, where the one or more control messages include an indication that the LCM operation is based on the performance of the ML model or ML model-based functionality, the indication comprising the performance report. The operations of block 1620 may be performed in accordance with examples as disclosed herein. In some examples, aspects of the operations of 1620 may be performed by an LCM component 1125 as described with reference to FIG. 11.

FIG. 17 shows a flowchart illustrating a method 1700 that supports indicating causes for LCM operations in accordance with aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a UE, an ML model configuration for an ML model or ML model-based functionality of the UE. The operations of block 1705 may be performed in accordance with examples as disclosed herein. In some examples, aspects of the operations of 1705 may be performed by an ML model configuration component 1130 as described with reference to FIG. 11.

At 1710, the method may include receiving a performance report associated with the ML model or ML model-based functionality based on an LCM operation for the ML model or ML model-based functionality, the performance report indicating one or more performance metrics associated with a performance of the ML model or ML model-based functionality. The operations of block 1710 may be performed in accordance with examples as disclosed herein. In some examples, aspects of the operations of 1710 may be performed by a performance report component 1135 as described with reference to FIG. 11.

At 1715, the method may include updating the ML model or ML model-based functionality based on the performance report. The operations of block 1715 may be performed in accordance with examples as disclosed herein. In some examples, aspects of the operations of 1715 may be performed by an ML model performance component 1140 as described with reference to FIG. 11.

Figure 18:
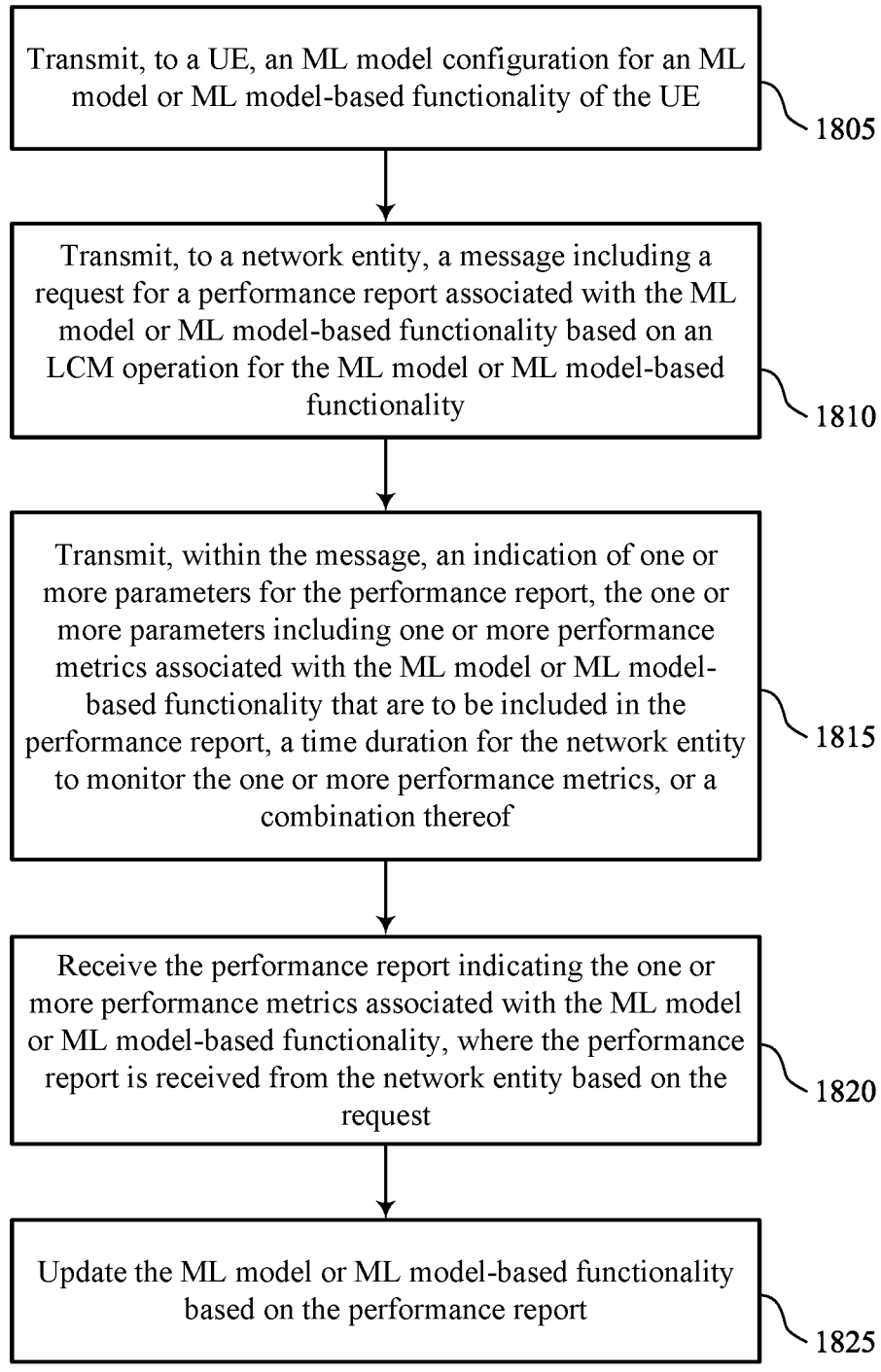

FIG. 18 shows a flowchart illustrating a method 1800 that supports indicating causes for LCM operations in accordance with aspects of the present disclosure. The operations of the method 1800 may be implemented by a network entity or its components as described herein. For example, the operations of the method 1800 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1805, the method may include transmitting, to a UE, an ML model configuration for an ML model or ML model-based functionality of the UE. The operations of block 1805 may be performed in accordance with examples as disclosed herein. In some examples, aspects of the operations of 1805 may be performed by an ML model configuration component 1130 as described with reference to FIG. 11.

At 1810, the method may include transmitting, to a network entity, a message including a request for the performance report based on an LCM operation for the ML model or ML model-based functionality. The operations of block 1810 may be performed in accordance with examples as disclosed herein. In some examples, aspects of the operations of 1810 may be performed by a performance report component 1135 as described with reference to FIG. 11.

At 1815, the method may include transmitting, within the message, an indication of one or more parameters for the performance report, the one or more parameters including one or more performance metrics associated with the ML model or ML model-based functionality that are to be included in the performance report, a time duration for the network entity to monitor the one or more performance metrics, or a combination thereof. The operations of block 1815 may be performed in accordance with examples as disclosed herein. In some examples, aspects of the operations of 1815 may be performed by a performance report component 1135 as described with reference to FIG. 11.

At 1820, the method may include receiving the performance report indicating the one or more performance metrics associated with the ML model or ML model-based functionality, where the performance report is received from the network entity based on the request. The operations of block 1820 may be performed in accordance with examples as disclosed herein. In some examples, aspects of the operations of 1820 may be performed by a performance report component 1135 as described with reference to FIG. 11.

At 1825, the method may include updating the ML model or ML model-based functionality based on the performance report. The operations of block 1825 may be performed in accordance with examples as disclosed herein. In some examples, aspects of the operations of 1825 may be performed by an ML model performance component 1140 as described with reference to FIG. 11.

The following provides an overview of aspects of the present disclosure:

Aspect 1: A method for wireless communication by a UE, comprising: receiving one or more control messages that indicate an LCM operation for an ML model or ML model-based functionality associated with the UE, wherein the one or more control messages comprise an indication of whether the LCM operation is based at least in part on a performance of the ML model or ML model-based functionality; and performing the LCM operation for the ML model or ML model-based functionality based at least in part on the one or more control messages.

Aspect 2: The method of aspect 1, wherein the indication further comprises a cause of the LCM operation, the cause comprising at least one of the performance of the ML model or ML model-based functionality, a network associated with the UE being overloaded, and a network associated with the UE transitioning to an energy-saving mode.

Aspect 3: The method of any of aspects 1 through 2, wherein the indication further comprises a performance report for the ML model or ML model-based functionality based at least in part on the LCM operation.

Aspect 4: The method of aspect 3, further comprising: transmitting, to a network entity, a message including a request for the performance report, wherein receiving the one or more control messages is based at least in part on the request.

Aspect 5: The method of aspect 4, further comprising: transmitting, within the message, an indication of one or more parameters for the performance report, the one or more parameters comprising one or more performance metrics associated with the ML model or ML model-based functionality that are to be included in the performance report, a time duration for the network entity to monitor the one or more performance metrics, or a combination thereof.

Aspect 6: The method of any of aspects 3 through 5, further comprising: transmitting the performance report to a server associated with the ML model or ML model-based functionality based at least in part on receiving the one or more control messages.

Aspect 7: The method of aspect 6, further comprising: receiving the performance report from a network entity, wherein transmitting the performance report is based at least in part on receiving the performance report.

Aspect 8: The method of any of aspects 3 through 7, wherein the performance report comprises at least one of an indication of one or more performance metrics associated with the ML model or ML model-based functionality, an indication of a time duration during which the one or more performance metrics were monitored, an indication of a network operation that triggered the LCM operation, an indication of a network performance metric that triggered the LCM operation, or a combination thereof.

Aspect 9: The method of any of aspects 3 through 8, wherein the performance report comprises one or more statistics corresponding to the performance of the ML model or ML model-based functionality for a time duration, the one or more statistics including an indication of an occurrence rate of LCM operations for the ML model or ML model-based functionality, a mapping between the performance of the ML model or ML model-based functionality and a set of LCM operations including the LCM operation, a list of one or more ML models or ML model-based functionalities to which the UE switched in accordance with the LCM operation, an indication of a respective occurrence rate associated with the UE switching to each ML model or ML model-based functionality of the one or more ML models or ML model-based functionalities, or a combination thereof.

Aspect 10: The method of any of aspects 1 through 9, further comprising: generating a performance report for the ML model or ML model-based functionality based at least in part on the indication that the LCM operation is based at least in part on the performance of the ML model or ML model-based functionality, the performance report comprising an identifier of the ML model or ML model-based functionality based at least in part on the ML model or ML model-based functionality being active when the one or more control messages are received, an indication of a functionality of the ML model based at least in part on the functionality being active when the one or more control messages are received, an occurrence rate of LCM operations for the ML model or ML model-based functionality, a list of one or more ML models or ML model-based functionalities to which the UE switched in accordance with the LCM operation, or a combination thereof.

Aspect 11: The method of aspect 10, further comprising: transmitting the performance report to a server associated with the ML model or ML model-based functionality based at least in part on receiving the one or more control messages.

Aspect 12: The method of any of aspects 1 through 11, wherein the indication comprises a single bit, a first value of the bit corresponds to an indication that the LCM operation is based at least in part on the performance of the ML model or ML model-based functionality, and a second value of the bit corresponds to an indication that the LCM operation is based at least in part on a performance metric of a network to which the UE belongs.

Aspect 13: The method of any of aspects 1 through 12, wherein the LCM operation comprises at least one of activation of the ML model or ML model-based functionality, deactivation of the ML model or ML model-based functionality, a fallback to the ML model or ML model-based functionality, and a switch to the ML model or ML model-based functionality.

Aspect 14: The method of any of aspects 1 through 13, wherein the indication comprises information about a decision, by a network entity, to indicate the LCM operation to the UE.

Aspect 15: A method for wireless communication by a network entity, comprising: selecting an LCM operation to be performed by a UE for an ML model or ML model-based functionality at the UE; and transmitting, to the UE, one or more control messages that indicate the LCM operation for the ML model or ML model-based functionality, wherein the one or more control messages comprise an indication of whether the LCM operation is based at least in part on a performance of the ML model or ML model-based functionality.

Aspect 16: The method of aspect 15, further comprising: monitoring one or more performance metrics associated with the performance of the ML model or ML model-based functionality, wherein the LCM operation is selected based at least in part on the one or more performance metrics, and wherein the one or more control messages comprise the indication that the LCM operation is based at least in part on the performance of the ML model or ML model-based functionality.

Aspect 17: The method of any of aspects 15 through 16, further comprising: monitoring one or more network performance metrics associated with a network to which the network entity and the UE belong, wherein the LCM operation is selected based at least in part on the one or more network performance metrics, and wherein the one or more control messages comprise the indication that the LCM operation is based at least in part on the one or more network performance metrics.

Aspect 18: The method of any of aspects 15 through 17, wherein the LCM operation is selected in accordance with a decision, by a network to which the network entity and the UE belong, to operate in an energy-saving mode, and the one or more control messages comprise the indication that the LCM operation is based at least in part on the decision.

Aspect 19: The method of any of aspects 15 through 18, wherein transmitting the one or more control messages comprises: generating a performance report for the ML model or ML model-based functionality based at least in part on the LCM operation; and transmitting the indication comprising the performance report.

Aspect 20: The method of aspect 19, further comprising: receiving a message including a request for the performance report, wherein transmitting the one or more control messages is based at least in part on the request.

Aspect 21: The method of any of aspects 19 through 20, further comprising: receiving a message indicating one or more parameters for the performance report, the one or more parameters comprising one or more performance metrics associated with the ML model or ML model-based functionality that are to be included in the performance report, a time duration for the network entity to monitor the one or more performance metrics, or a combination thereof, wherein the indication comprising the performance report is transmitted in accordance with the one or more parameters.

Aspect 22: The method of any of aspects 19 through 21, further comprising: transmitting the performance report to a server associated with the ML model or ML model-based functionality based at least in part on transmitting the one or more control messages.

Aspect 23: The method of any of aspects 19 through 22, wherein the performance report comprises at least one of an indication of one or more performance metrics associated with the ML model or ML model-based functionality, an indication of a time duration during which the one or more performance metrics were monitored, an indication of a network operation that triggered the LCM operation, an indication of a network performance metric that triggered the LCM operation, or a combination thereof.

Aspect 24: The method of any of aspects 19 through 23, wherein the performance report comprises one or more statistics corresponding to the performance of the ML model or ML model-based functionality for a time duration, the one or more statistics including an indication of an occurrence rate of LCM operations for the ML model or ML model-based functionality, a mapping between the performance of the ML model or ML model-based functionality and a set of LCM operations including the LCM operation, a list of one or more ML models or ML model-based functionalities to which the UE switched in accordance with the LCM operation, an indication of a respective occurrence rate associated with the UE switching to each ML model or ML model-based functionality of the one or more ML models or ML model-based functionalities, or a combination thereof.

Aspect 25: The method of any of aspects 15 through 24, wherein the indication comprises a single bit, a first value of the bit corresponds to an indication that the LCM operation is based at least in part on the performance of the ML model or ML model-based functionality, and a second value of the bit corresponds to an indication that the LCM operation is based at least in part on a performance metric of a network to which the UE belongs.

Aspect 26: The method of any of aspects 15 through 25, wherein the LCM operation comprises at least one of activation of the ML model or ML model-based functionality, deactivation of the ML model or ML model-based functionality, a fallback to the ML model or ML model-based functionality, and a switch to the ML model or ML model-based functionality.

Aspect 27: A method for wireless communication by a server, comprising: transmitting, to a UE, an ML model configuration for an ML model or ML model-based functionality of the UE; receiving a performance report associated with the ML model or ML model-based functionality based at least in part on an LCM operation for the ML model or ML model-based functionality, the performance report indicating one or more performance metrics associated with a performance of the ML model or ML model-based functionality; and updating the ML model or ML model-based functionality based at least in part on the performance report.

Aspect 28: The method of aspect 27, further comprising: transmitting, to a network entity, a message including a request for the performance report, wherein the performance report is received from the network entity based at least in part on the request.

Aspect 29: The method of aspect 28, further comprising: transmitting, within the message, an indication of one or more parameters for the performance report, the one or more parameters comprising one or more performance metrics associated with the ML model or ML model-based functionality that are to be included in the performance report, a time duration for the network entity to monitor the one or more performance metrics, or a combination thereof.

Aspect 30: The method of any of aspects 27 through 29, wherein the performance report comprises at least one of an indication of one or more performance metrics associated with the ML model or ML model-based functionality, an indication of a time duration during which the one or more performance metrics were monitored, an indication of a network operation that triggered the LCM operation, an indication of a network performance metric that triggered the LCM operation, or a combination thereof.

Aspect 31: The method of any of aspects 27 through 30, wherein the performance report comprises one or more statistics corresponding to the performance of the ML model or ML model-based functionality for a time duration, the one or more statistics including an indication of an occurrence rate of LCM operations for the ML model or ML model-based functionality, a mapping between the performance of the ML model and a set of LCM operations including the LCM operation, a list of one or more ML models or ML model-based functionalities to which the UE switched in accordance with the LCM operation, an indication of a respective occurrence rate associated with the UE switching to each ML model or ML model-based functionality of the one or more ML models or ML model-based functionalities, or a combination thereof.

Aspect 32: The method of any of aspects 27 through 31, wherein receiving the performance report comprises: receiving the performance report from the UE, the performance report comprising an identifier of the ML model or ML model-based functionality, an indication of a functionality of the ML model or ML model-based functionality, an occurrence rate of LCM operations for the ML model or ML model-based functionality, a list of one or more ML models or ML model-based functionalities to which the UE switched in accordance with the LCM operation, or a combination thereof.

Aspect 33: The method of any of aspects 27 through 32, further comprising: retraining the ML model or ML model-based functionality based at least in part on the performance report.

Aspect 34: A UE for wireless communication, comprising one or more memories storing processor-executable code, and one or more processors coupled with the one or more memories and individually or collectively operable to execute the code to cause the UE to perform a method of any of aspects 1 through 14.

Aspect 35: A UE for wireless communication, comprising at least one means for performing a method of any of aspects 1 through 14.

Aspect 36: A non-transitory computer-readable medium storing code for wireless communication, the code comprising instructions executable by at least one processor to perform a method of any of aspects 1 through 14.

Aspect 37: A network entity for wireless communication, comprising one or more memories storing processor-executable code, and one or more processors coupled with the one or more memories and individually or collectively operable to execute the code to cause the network entity to perform a method of any of aspects 15 through 26.

Aspect 38: A network entity for wireless communication, comprising at least one means for performing a method of any of aspects 15 through 26.

Aspect 39: A non-transitory computer-readable medium storing code for wireless communication, the code comprising instructions executable by at least one processor to perform a method of any of aspects 15 through 26.

Aspect 40: A server for wireless communication, comprising one or more memories storing processor-executable code, and one or more processors coupled with the one or more memories and individually or collectively operable to execute the code to cause the server to perform a method of any of aspects 27 through 33.

Aspect 41: A server for wireless communication, comprising at least one means for performing a method of any of aspects 27 through 33.

Aspect 42: A non-transitory computer-readable medium storing code for wireless communication, the code comprising instructions executable by at least one processor to perform a method of any of aspects 27 through 33.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

63

What is claimed is:

1. A user equipment (UE), comprising:
one or more memories storing processor-executable code; and
one or more processors coupled with the one or more memories and individually or collectively operable to execute the code to cause the UE to:
receive one or more control messages that indicate a life cycle management operation for a machine learning model or machine learning model-based functionality associated with the UE, wherein the one or more control messages comprise an indication of whether the life cycle management operation is based at least in part on a performance of the machine learning model or machine learning model-based functionality; and
perform the life cycle management operation for the machine learning model or machine learning model-based functionality based at least in part on the one or more control messages.

2. The UE of claim 1, wherein the indication further comprises a cause of the life cycle management operation, the cause comprising at least one of the performance of the machine learning model or machine learning model-based functionality, a network associated with the UE being overloaded, and a network associated with the UE transitioning to an energy-saving mode.

3. The UE of claim 1, wherein the indication further comprises a performance report for the machine learning model or machine learning model-based functionality based at least in part on the life cycle management operation.

4. The UE of claim 3, wherein the one or more processors are individually or collectively further operable to execute the code to cause the UE to:
transmit, to a network entity, a message including a request for the performance report, wherein receiving the one or more control messages is based at least in part on the request.

5. The UE of claim 4, wherein the one or more processors are individually or collectively further operable to execute the code to cause the UE to:
transmit, within the message, an indication of one or more parameters for the performance report, the one or more parameters comprising one or more performance metrics associated with the machine learning model or machine learning model-based functionality that are to be included in the performance report, a time duration for the network entity to monitor the one or more performance metrics, or a combination thereof.

6. The UE of claim 3, wherein the one or more processors are individually or collectively further operable to execute the code to cause the UE to:
transmit the performance report to a server associated with the machine learning model or machine learning model-based functionality based at least in part on receiving the one or more control messages.

7. The UE of claim 6, wherein the one or more processors are individually or collectively further operable to execute the code to cause the UE to:
receive the performance report from a network entity, wherein transmitting the performance report is based at least in part on receiving the performance report.

8. The UE of claim 3, wherein the performance report comprises at least one of an indication of one or more performance metrics associated with the machine learning model or machine learning model-based functionality, an indication of a time duration during which the one or more performance metrics were monitored, an indication of a network operation that triggered the life cycle management operation, an indication of a network performance metric that triggered the life cycle management operation, or a combination thereof.

9. The UE of claim 3, wherein the performance report comprises one or more statistics corresponding to the performance of the machine learning model or machine learning model-based functionality for a time duration, the one or more statistics including an indication of an occurrence rate of life cycle management operations for the machine learning model or machine learning model-based functionality, a mapping between the performance of the machine learning model or machine learning model-based functionality and a set of life cycle management operations including the life cycle management operation, a list of one or more machine learning models or machine learning model-based functionalities to which the UE switched in accordance with the life cycle management operation, an indication of a respective occurrence rate associated with the UE switching to each machine learning model or machine learning model-based functionality of the one or more machine learning models or machine learning model-based functionalities, or a combination thereof.

10. The UE of claim 1, wherein the one or more processors are individually or collectively further operable to execute the code to cause the UE to:
generate a performance report for the machine learning model or machine learning model-based functionality based at least in part on the indication that the life cycle management operation is based at least in part on the performance of the machine learning model or machine learning model-based functionality, the performance report comprising an identifier of the machine learning model or machine learning model-based functionality based at least in part on the machine learning model or machine learning model-based functionality being active when the one or more control messages are received, an indication of a functionality of the machine learning model based at least in part on the functionality being active when the one or more control messages are received, an occurrence rate of life cycle management operations for the machine learning model or machine learning model-based functionality, a list of one or more machine learning models or machine learning model-based functionalities to which the UE switched in accordance with the life cycle management operation, or a combination thereof.

11. The UE of claim 10, wherein the one or more processors are individually or collectively further operable to execute the code to cause the UE to:
transmit the performance report to a server associated with the machine learning model or machine learning model-based functionality based at least in part on receiving the one or more control messages.

12. The UE of claim 1, wherein:
the indication comprises a single bit,
a first value of the bit corresponds to an indication that the life cycle management operation is based at least in part on the performance of the machine learning model or machine learning model-based functionality, and
a second value of the bit corresponds to an indication that the life cycle management operation is based at least in part on a performance metric of a network to which the UE belongs.

13. The UE of claim 1, wherein the indication further comprises information about a decision, by a network entity, to indicate the life cycle management operation to the UE.

14. A network entity, comprising:

one or more memories storing processor-executable code; and one or more processors coupled with the one or more memories and individually or collectively operable to execute the code to cause the network entity to:

select a life cycle management operation to be performed by a user equipment (UE) for a machine learning model or machine learning model-based functionality at the UE; and transmit, to the UE, one or more control messages that indicate the life cycle management operation for the machine learning model or machine learning model-based functionality, wherein the one or more control messages comprise an indication of whether the life cycle management operation is based at least in part on a performance of the machine learning model or machine learning model-based functionality.

15. The network entity of claim 14, wherein the one or more processors are individually or collectively further operable to execute the code to cause the network entity to:

monitor one or more performance metrics associated with the performance of the machine learning model or machine learning model-based functionality, wherein the life cycle management operation is selected based at least in part on the one or more performance metrics, and wherein the one or more control messages comprise the indication that the life cycle management operation is based at least in part on the performance of the machine learning model or machine learning model-based functionality.

16. The network entity of claim 14, wherein the one or more processors are individually or collectively further operable to execute the code to cause the network entity to:

monitor one or more network performance metrics associated with a network to which the network entity and the UE belong, wherein the life cycle management operation is selected based at least in part on the one or more network performance metrics, and wherein the one or more control messages comprise the indication that the life cycle management operation is based at least in part on the one or more network performance metrics.

17. The network entity of claim 14, wherein:

the life cycle management operation is selected in accordance with a decision, by a network associated with the network entity and the UE, to operate in an energy-saving mode, and the one or more control messages comprise the indication that the life cycle management operation is based at least in part on the decision.

18. The network entity of claim 14, wherein, to transmit the one or more control messages, the one or more processors are individually or collectively operable to execute the code to cause the network entity to:

generate a performance report for the machine learning model or machine learning model-based functionality based at least in part on the life cycle management operation; and transmit the indication comprising the performance report.

19. The network entity of claim 18, wherein the one or more processors are individually or collectively further operable to execute the code to cause the network entity to:

receive a message including a request for the performance report, wherein transmitting the one or more control messages is based at least in part on the request.

20. The network entity of claim 18, wherein the one or more processors are individually or collectively further operable to execute the code to cause the network entity to:

receive a message indicating one or more parameters for the performance report, the one or more parameters comprising one or more performance metrics associated with the machine learning model or machine learning model-based functionality that are to be included in the performance report, a time duration for the network entity to monitor the one or more performance metrics, or a combination thereof, wherein the indication comprising the performance report is transmitted in accordance with the one or more parameters.

21. The network entity of claim 18, wherein the one or more processors are individually or collectively further operable to execute the code to cause the network entity to:

transmit the performance report to a server associated with the machine learning model or machine learning model-based functionality based at least in part on transmitting the one or more control messages.

22. The network entity of claim 18, wherein the performance report comprises at least one of an indication of one or more performance metrics associated with the machine learning model or machine learning model-based functionality, an indication of a time duration during which the one or more performance metrics were monitored, an indication of a network operation that triggered the life cycle management operation, an indication of a network performance metric that triggered the life cycle management operation, or a combination thereof.

23. The network entity of claim 18, wherein the performance report comprises one or more statistics corresponding to the performance of the machine learning model or machine learning model-based functionality for a time duration, the one or more statistics including an indication of an occurrence rate of life cycle management operations for the machine learning model or machine learning model-based functionality, a mapping between the performance of the machine learning model or machine learning model-based functionality and a set of life cycle management operations including the life cycle management operation, a list of one or more machine learning models or machine learning model-based functionalities to which the UE switched in accordance with the life cycle management operation, an indication of a respective occurrence rate associated with the UE switching to each machine learning model or machine learning model-based functionality of the one or more machine learning models or machine learning model-based functionalities, or a combination thereof.

24. The network entity of claim 14, wherein:

the indication comprises a single bit, a first value of the bit corresponds to an indication that the life cycle management operation is based at least in part on the performance of the machine learning model or machine learning model-based functionality, and a second value of the bit corresponds to an indication that the life cycle management operation is based at least in part on a performance metric of a network to which the UE belongs.

25. A server, comprising:

one or more memories storing processor-executable code; and one or more processors coupled with the one or more memories and individually or collectively operable to execute the code to cause the server to:

transmit, to a user equipment (UE), a machine learning model configuration for a machine learning model or machine learning model-based functionality of the UE;

receive a performance report associated with the machine learning model or machine learning model-based functionality based at least in part on a life cycle management operation for the machine learning model or machine learning model-based functionality, the performance report indicating one or more performance metrics associated with a performance of the machine learning model or machine learning model-based functionality; and update the machine learning model or machine learning model-based functionality based at least in part on the performance report.

26. The server of claim 25, wherein the one or more processors are individually or collectively further operable to execute the code to cause the server to:

transmit, to a network entity, a message including a request for the performance report and including an indication of one or more parameters for the performance report, the one or more parameters comprising one or more performance metrics associated with the machine learning model or machine learning model-based functionality that are to be included in the performance report, a time duration for the network entity to monitor the one or more performance metrics, or a combination thereof, wherein the performance report is received from the network entity based at least in part on the request.

27. The server of claim 25, wherein the performance report comprises at least one of an indication of one or more performance metrics associated with the machine learning model or machine learning model-based functionality, an indication of a time duration during which the one or more performance metrics were monitored, an indication of a network operation that triggered the life cycle management operation, an indication of a network performance metric that triggered the life cycle management operation, or a combination thereof.

28. The server of claim 25, wherein the performance report comprises one or more statistics corresponding to the performance of the machine learning model or machine learning model-based functionality for a time duration, the one or more statistics including an indication of an occurrence rate of life cycle management operations for the machine learning model or machine learning model-based functionality, a mapping between the performance of the machine learning model and a set of life cycle management operations including the life cycle management operation, a list of one or more machine learning models or machine learning model-based functionalities to which the UE switched in accordance with the life cycle management operation, an indication of a respective occurrence rate associated with the UE switching to each machine learning model or machine learning model-based functionality of the one or more machine learning models or machine learning model-based functionalities, or a combination thereof.

29. The server of claim 25, wherein, to receive the performance report, the one or more processors are individually or collectively operable to execute the code to cause the server to:

receive the performance report from the UE, the performance report comprising an identifier of the machine learning model or machine learning model-based functionality, an indication of a functionality of the machine learning model or machine learning model-based functionality, an occurrence rate of life cycle management operations for the machine learning model or machine learning model-based functionality, a list of one or more machine learning models or machine learning model-based functionalities to which the UE switched in accordance with the life cycle management operation, or a combination thereof.

30. A method for wireless communication by a user equipment (UE), comprising:

receiving one or more control messages that indicate a life cycle management operation for a machine learning model or machine learning model-based functionality associated with the UE, wherein the one or more control messages comprise an indication of whether the life cycle management operation is based at least in part on a performance of the machine learning model or machine learning model-based functionality; and performing the life cycle management operation for the machine learning model or machine learning model-based functionality based at least in part on the one or more control messages.

* * * * *